(12) United States Patent
Yang et al.

(10) Patent No.: US 11,647,445 B2
(45) Date of Patent: May 9, 2023

(54) V2X COMMUNICATION DEVICE AND GEO-NETWORKING TRANSMISSION METHOD

(71) Applicant: LG ELECTRONICS INC., Seoul (KR)

(72) Inventors: Seungryul Yang, Seoul (KR); Woosuk Ko, Seoul (KR); Seoyoung Back, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 191 days.

(21) Appl. No.: 17/262,492

(22) PCT Filed: Jul. 23, 2018

(86) PCT No.: PCT/KR2018/008309
§ 371 (c)(1),
(2) Date: Jan. 22, 2021

(87) PCT Pub. No.: WO2020/022526
PCT Pub. Date: Jan. 30, 2020

(65) Prior Publication Data
US 2021/0314843 A1 Oct. 7, 2021

(51) Int. Cl.
*H04W 40/20* (2009.01)
*H04W 76/14* (2018.01)
*H04W 4/40* (2018.01)
*H04W 8/24* (2009.01)

(52) U.S. Cl.
CPC ............. *H04W 40/20* (2013.01); *H04W 4/40* (2018.02); *H04W 8/24* (2013.01); *H04W 76/14* (2018.02)

(58) Field of Classification Search
CPC ....... H04M 1/72406; H04W 4/02–029; H04W 4/40–48; H04W 8/005; H04W 40/20; H04W 40/205; H04W 60/06; H04W 76/14; H04W 84/005; H04W 84/18; H04W 88/04; H04W 8/24–245
See application file for complete search history.

(56) References Cited

U.S. PATENT DOCUMENTS

| 2017/0164187 A1 | 6/2017 | Lu | |
| 2018/0192462 A1* | 7/2018 | Hu | ......... H04W 76/15 |
| 2019/0199642 A1* | 6/2019 | Jiang | ...... H04L 47/17 |

(Continued)

FOREIGN PATENT DOCUMENTS

| EP | 3334214 A1 * | 6/2018 |
| WO | 2017189035 | 11/2017 |

OTHER PUBLICATIONS

PCT International Application No. PCT/KR2018/008309, International Search Report dated Apr. 19, 2019, 4 pages.

(Continued)

*Primary Examiner* — Thomas R Cairns
(74) *Attorney, Agent, or Firm* — Lee Hong Degerman Kang & Waimey

(57) ABSTRACT

A geo-networking transmission method of a V2X communication device includes using hybrid communication including direct communication and cellular communication. The method includes receiving a message from at least one neighboring vehicle and transmitting a geo-networking packet to at least one neighboring vehicle.

10 Claims, 39 Drawing Sheets

(56) References Cited

U.S. PATENT DOCUMENTS

2021/0099976 A1* 4/2021 Mueck ............... H04W 4/40

OTHER PUBLICATIONS

Michelle Wetterwald, et al., "Cross-layer Identities Management in ITS Stations," ITST 2010, 10th IEEE International Conference on ITS Telecommunications, Kyoto, Japan, Nov. 2010, 7 pages.
Jasper Kuperus, "Geonetworking solutions in V2V infrastructures," 13th Twente Student Conference on IT, Enschede, The Netherlands, Jun. 21, 2010, 10 pages.
Mohamed Ben Brahim, et al., "QoS-Aware Video Transmission Over Hybrid Wireless Network for Connected Vehicles," IEEE Access, Jun. 7, 2017, vol. 5, pp. 8313-8323.

* cited by examiner

[FIG. 1]
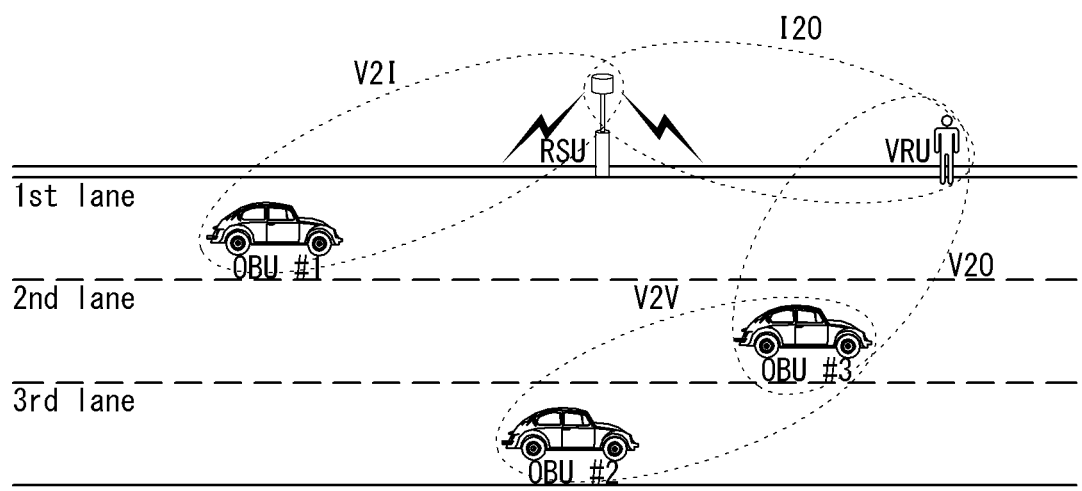

[FIG. 2]
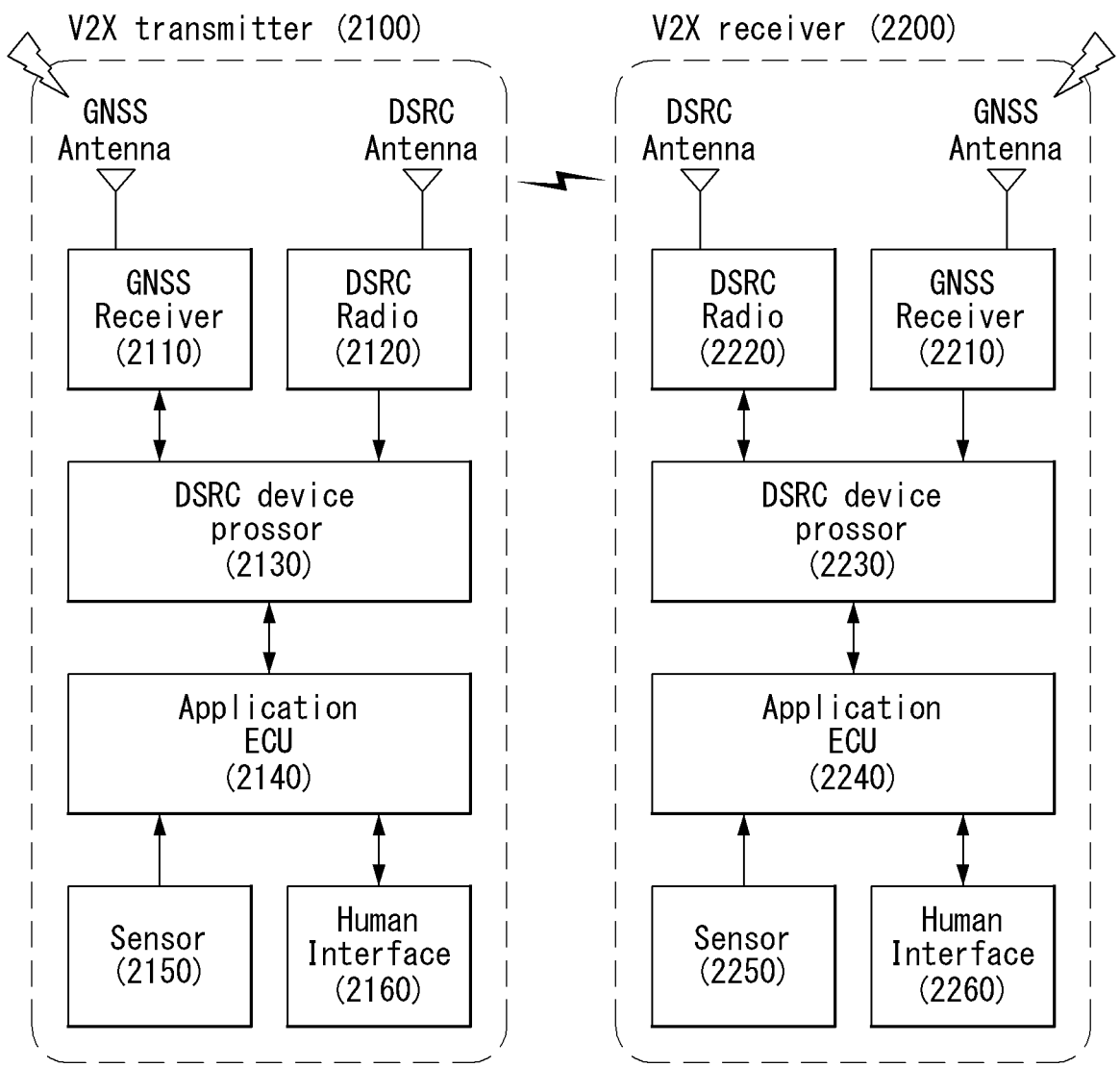

[FIG. 3]
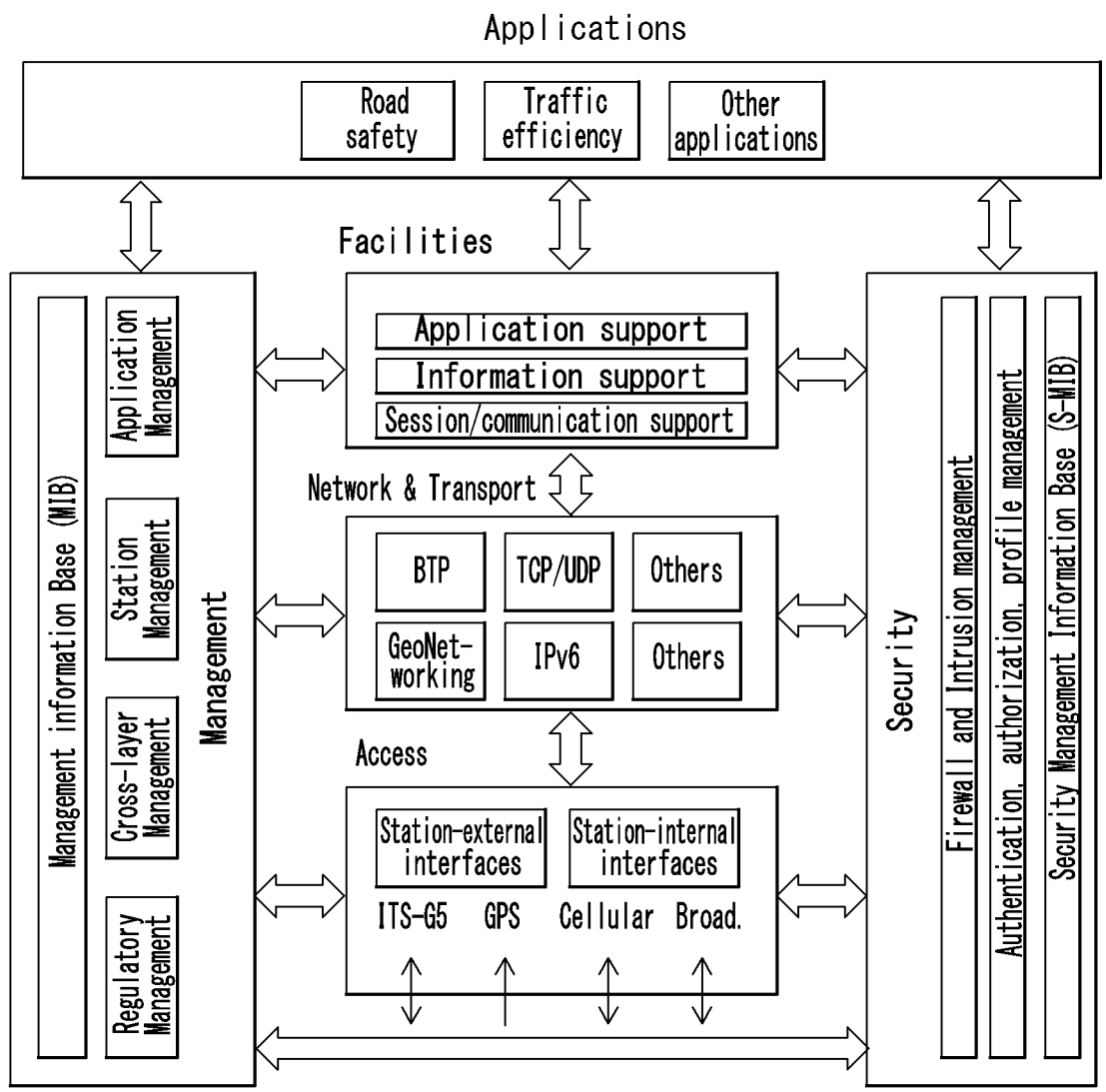

[FIG. 4]
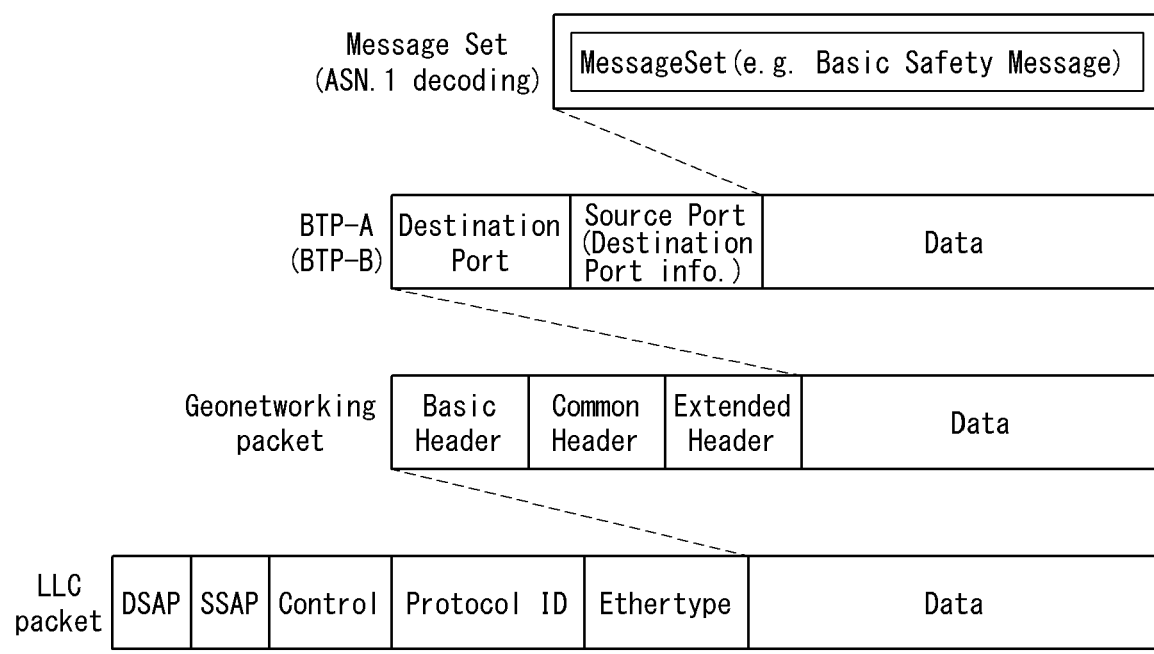

[FIG. 5]
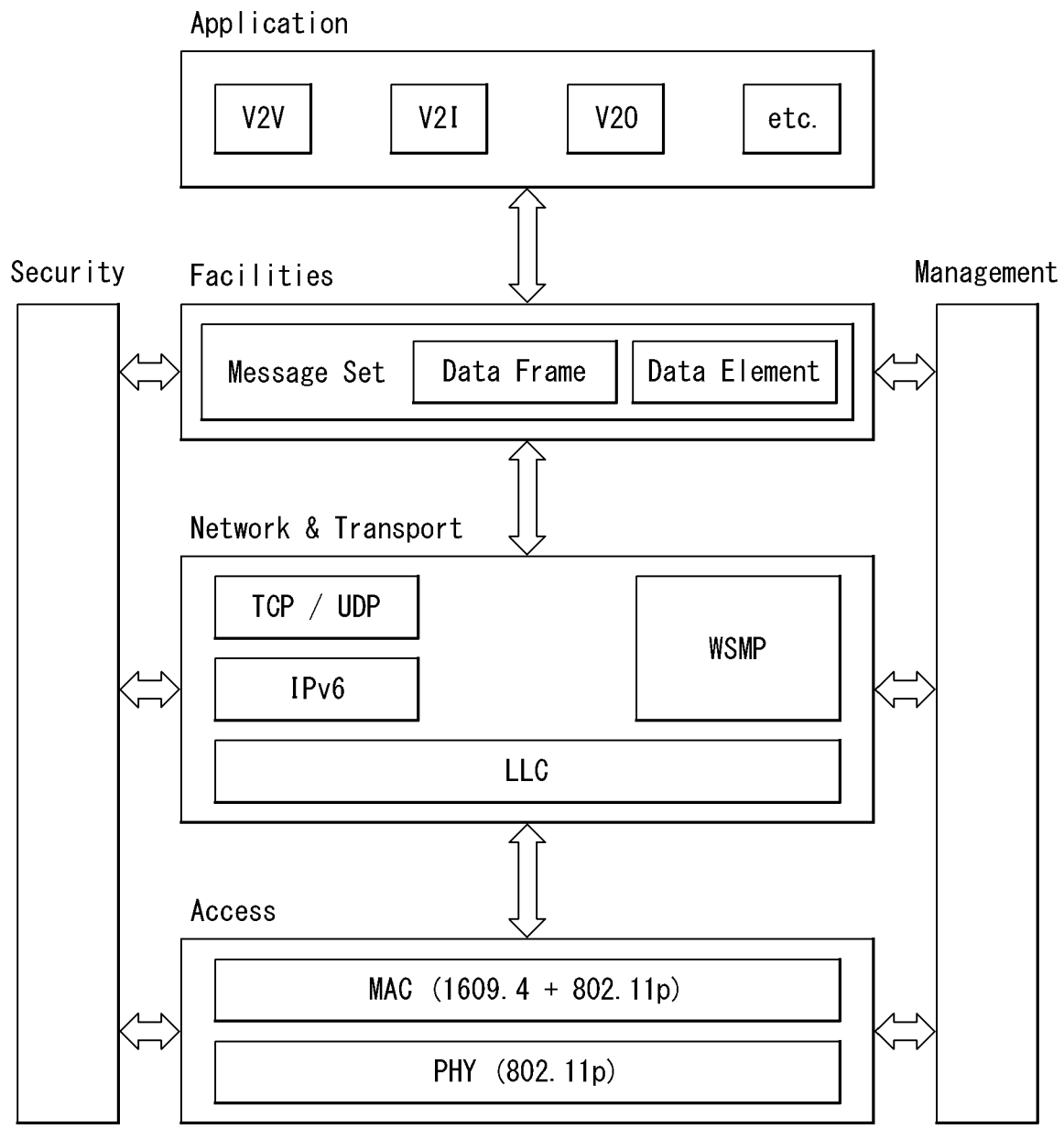

[FIG. 6]
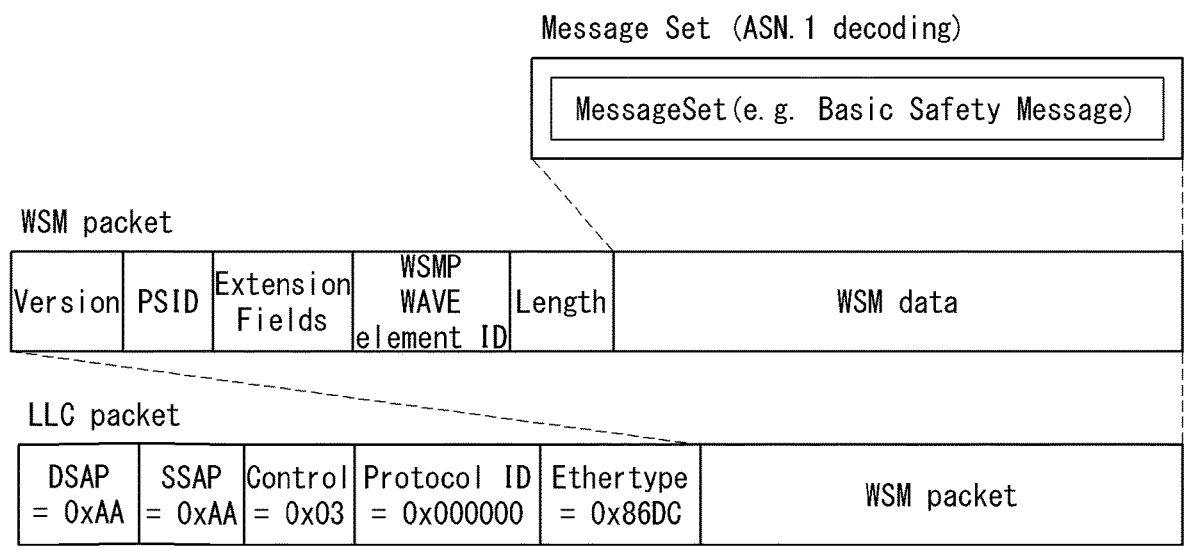

[FIG. 7]
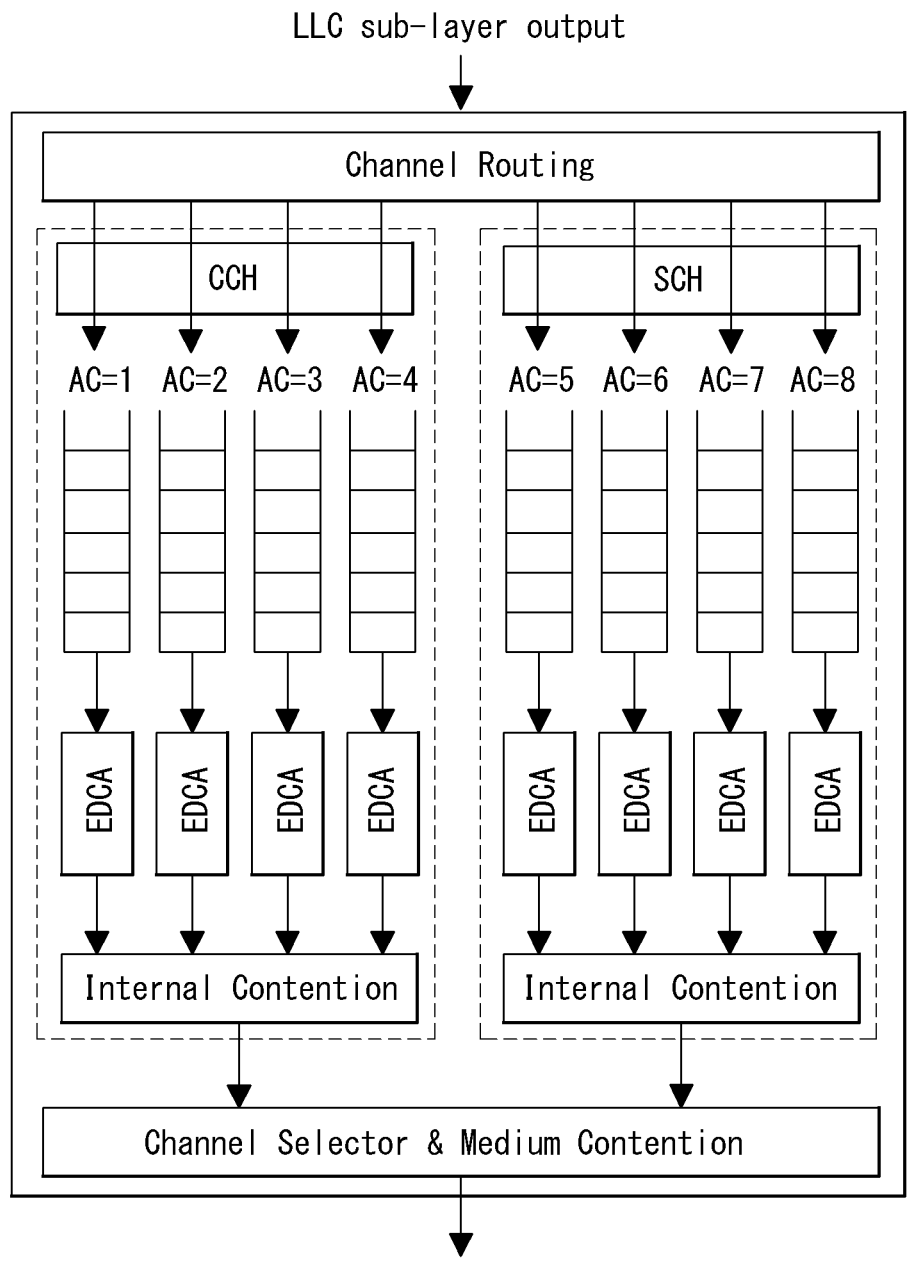

[FIG. 8(a)]
[FIG. 8(b)]
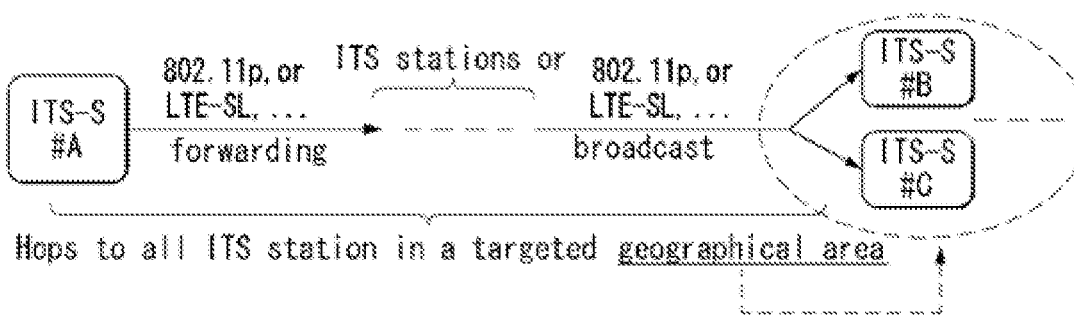
[FIG. 8(c)]
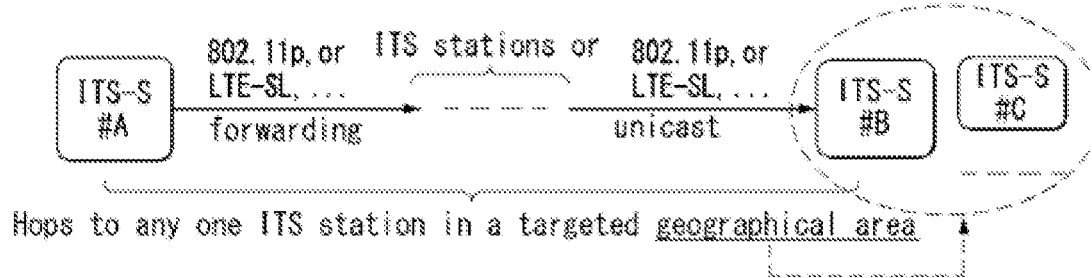

[FIG. 9(a)]
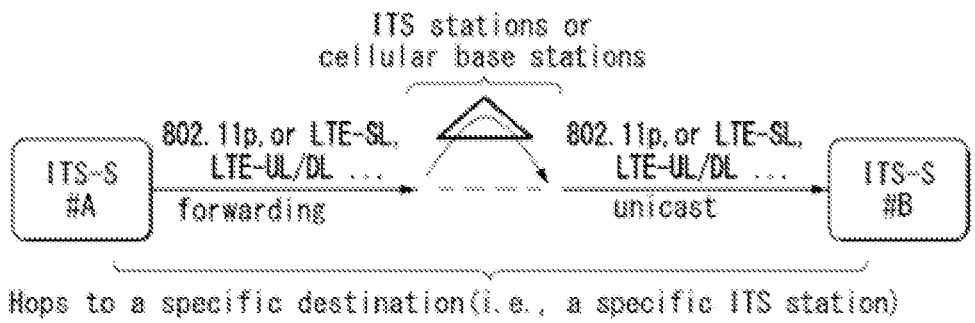
[FIG. 9(b)]
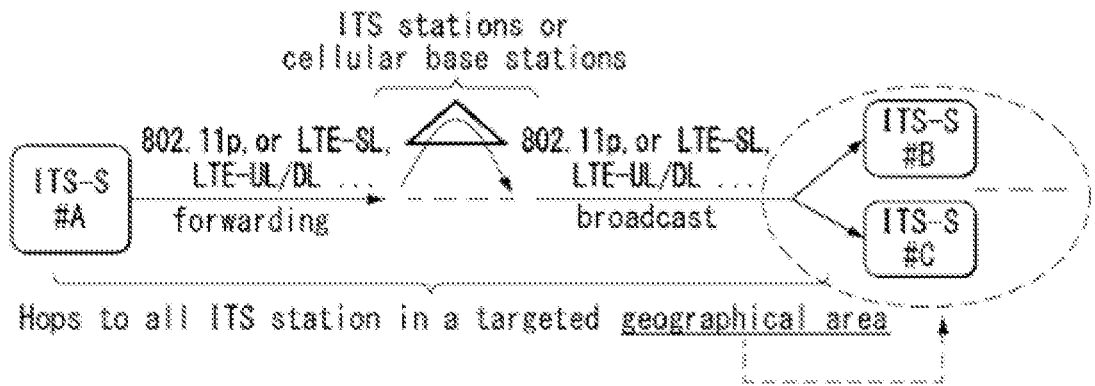
[FIG. 9(c)]
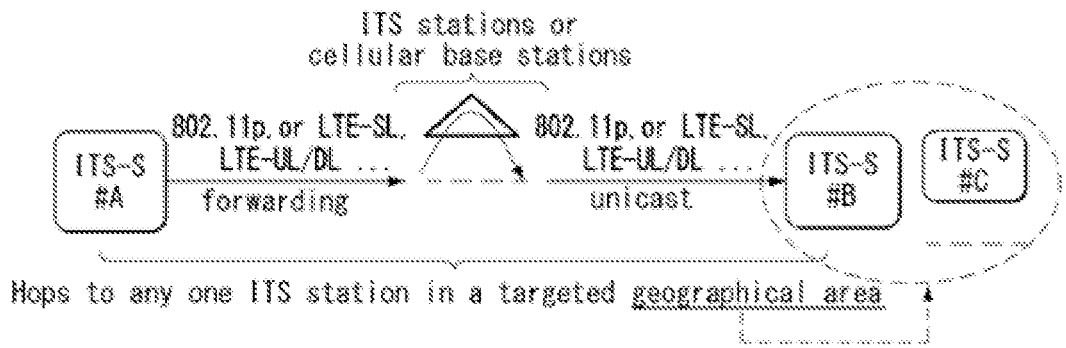

[FIG. 10]
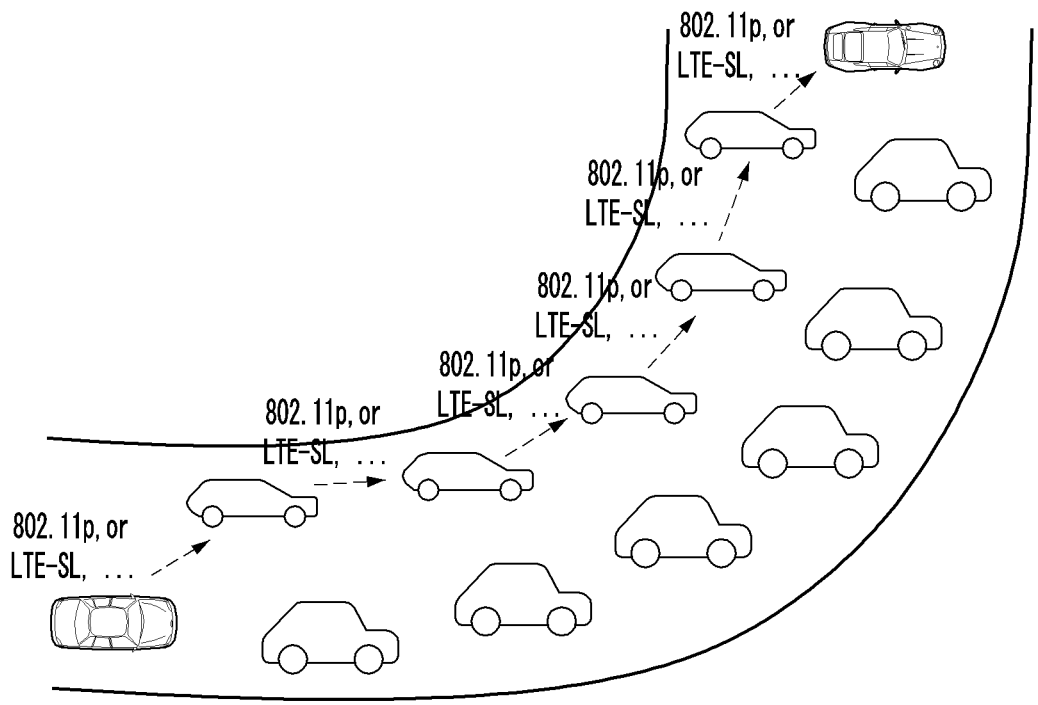

[FIG. 11(a)]
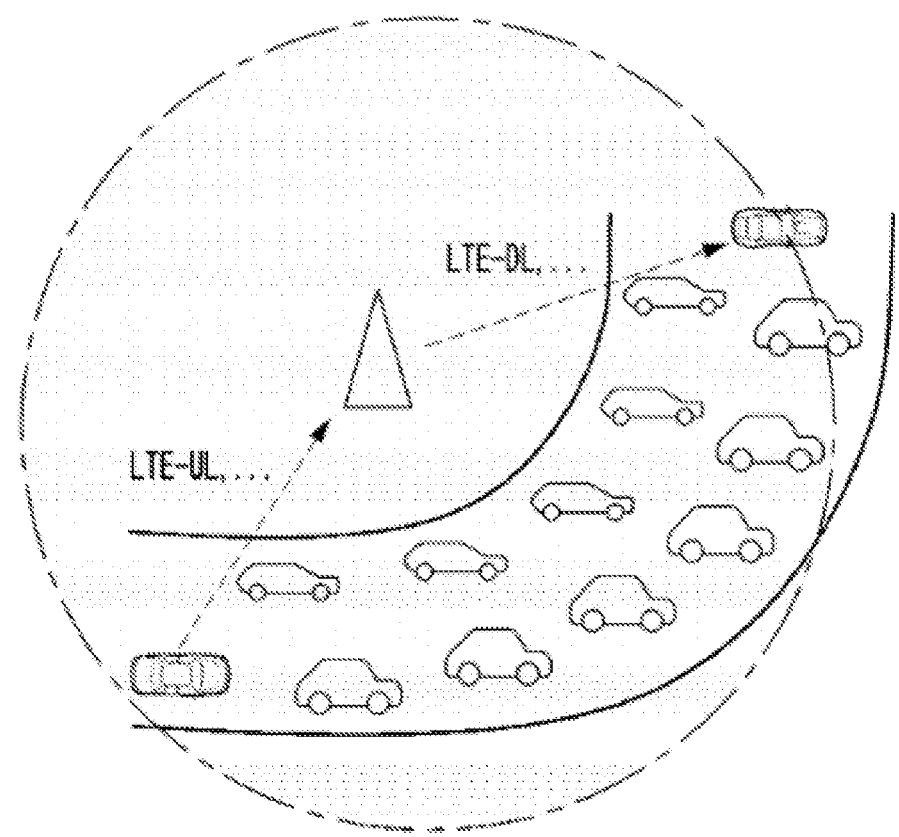

[FIG. 11(b)]
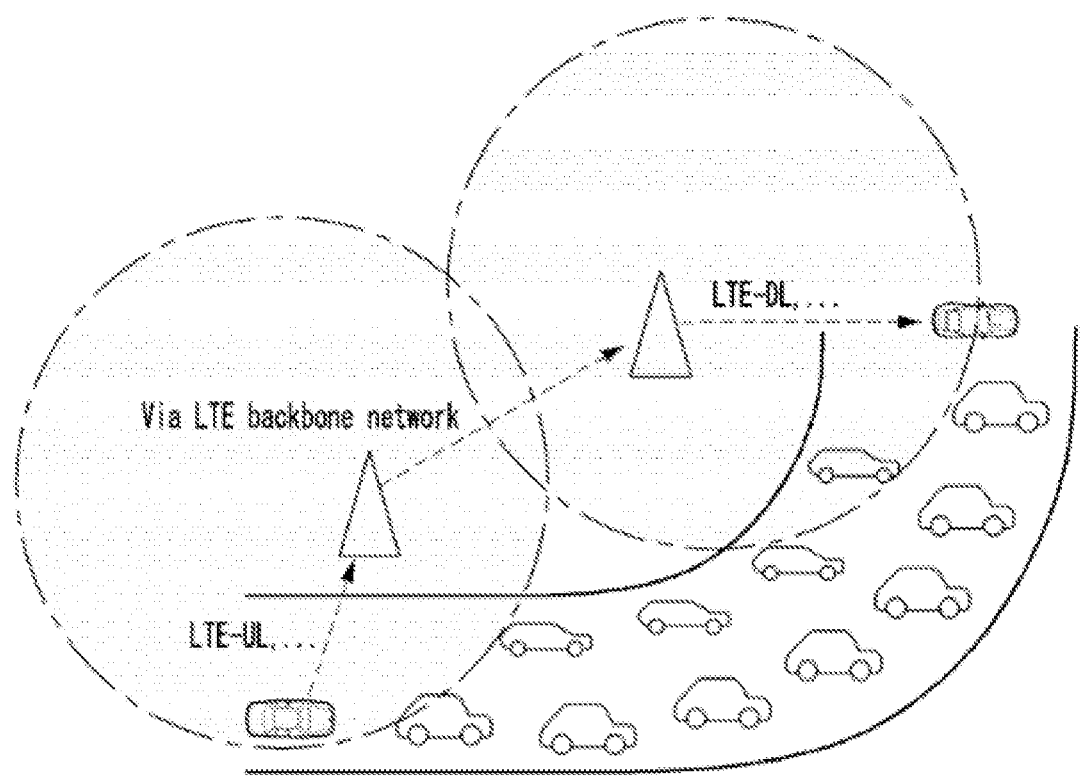

[FIG. 12]
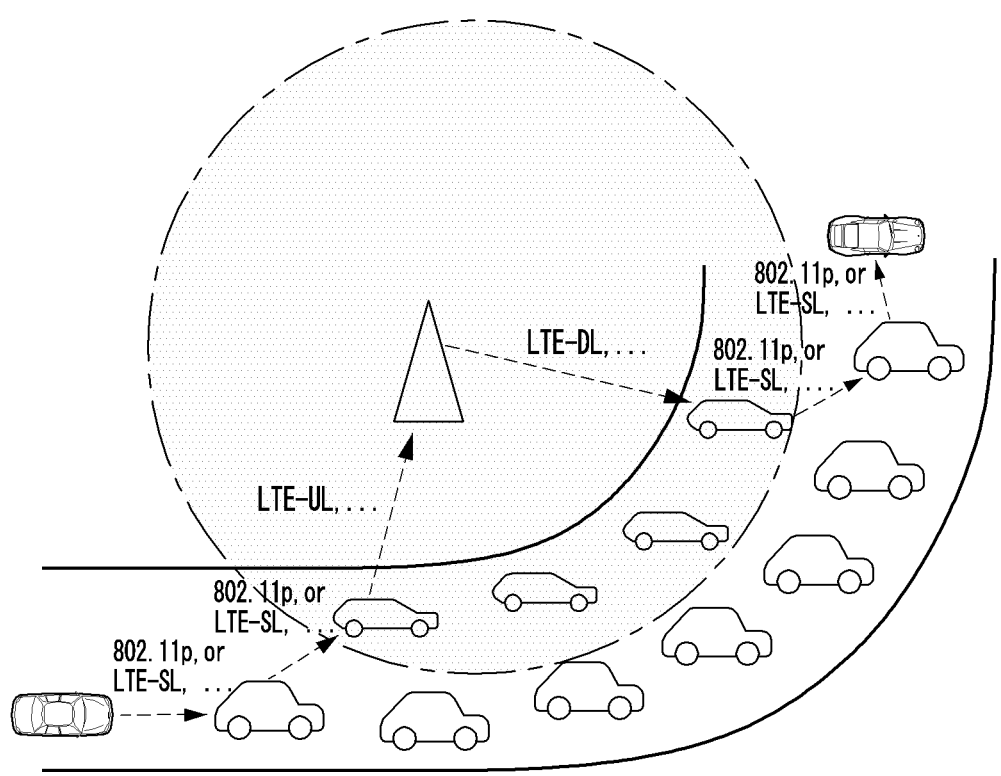

[FIG. 13]
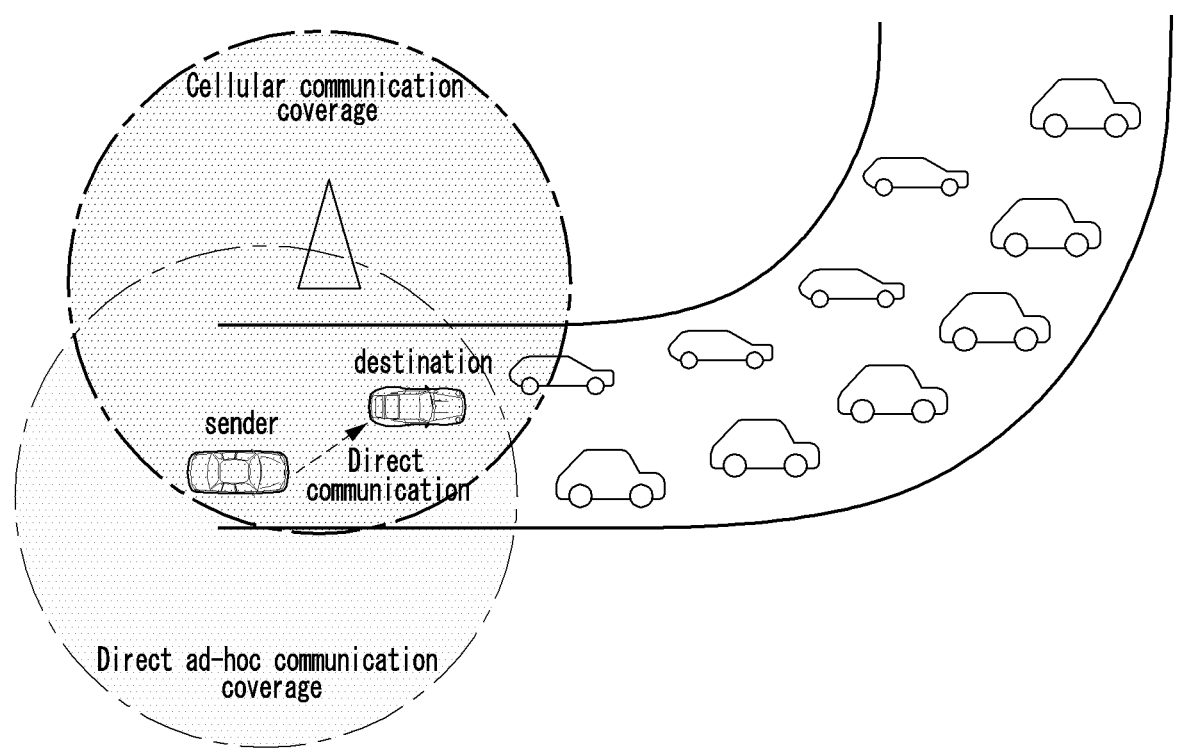

[FIG. 14]
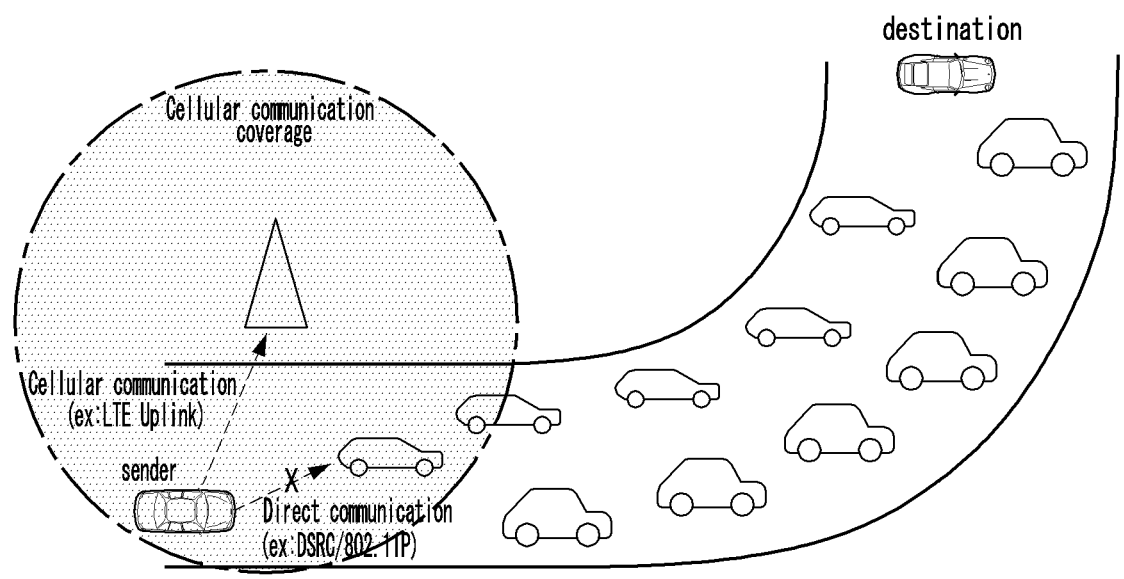

[FIG. 15]
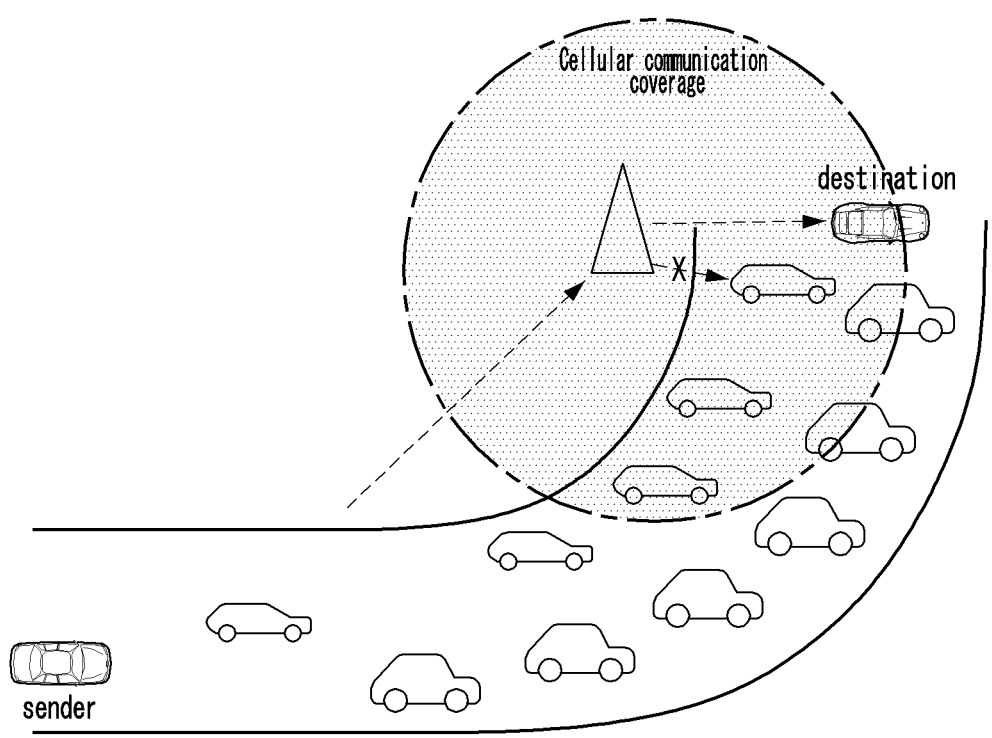

[FIG. 16]
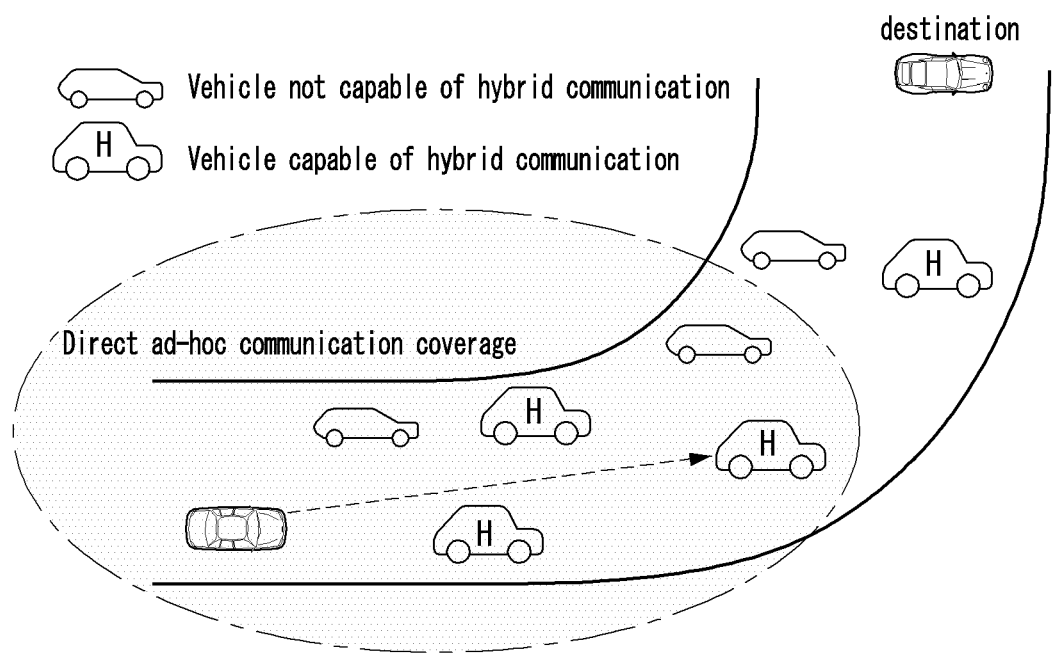
Enhanced Greedy Forwarding Algorithm for Hybrid communication #1 (EGF1)

[FIG. 17(a)]
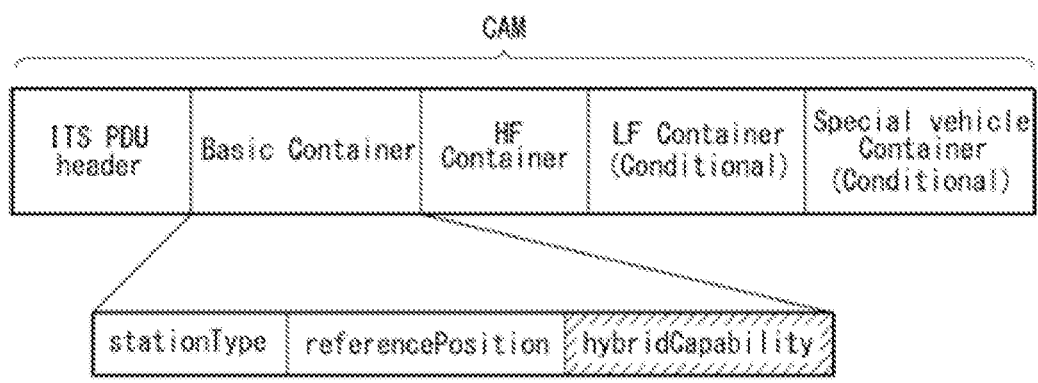
[FIG. 17(b)]
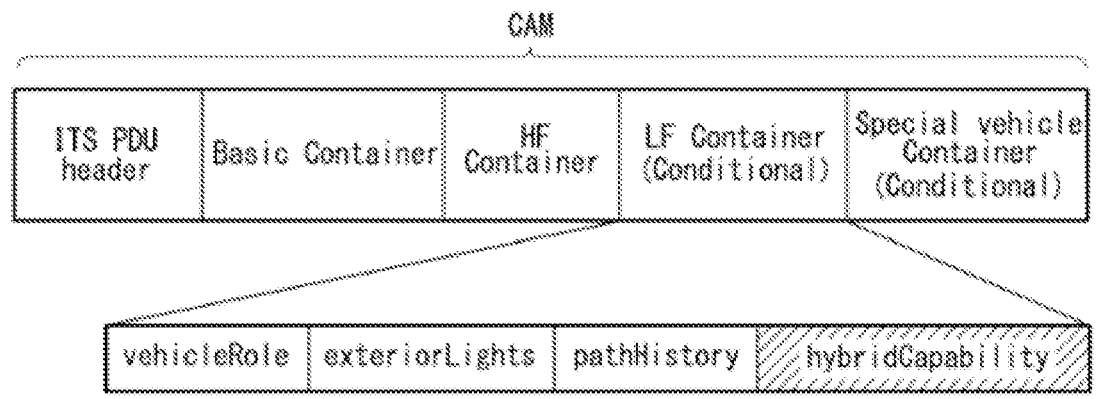

[FIG. 18(a)]
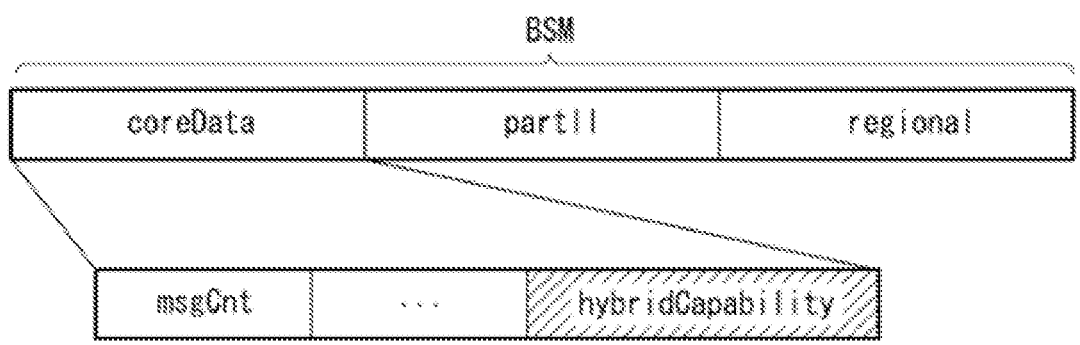
[FIG. 18(b)]
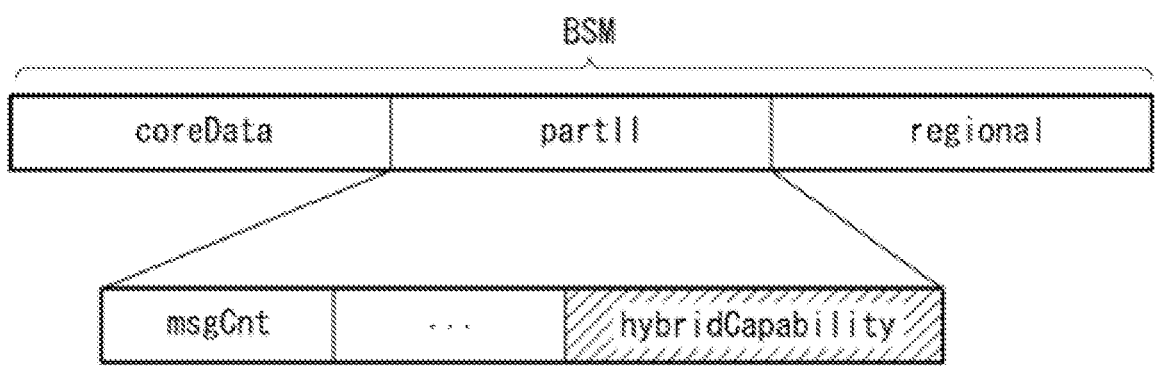

[FIG. 19]
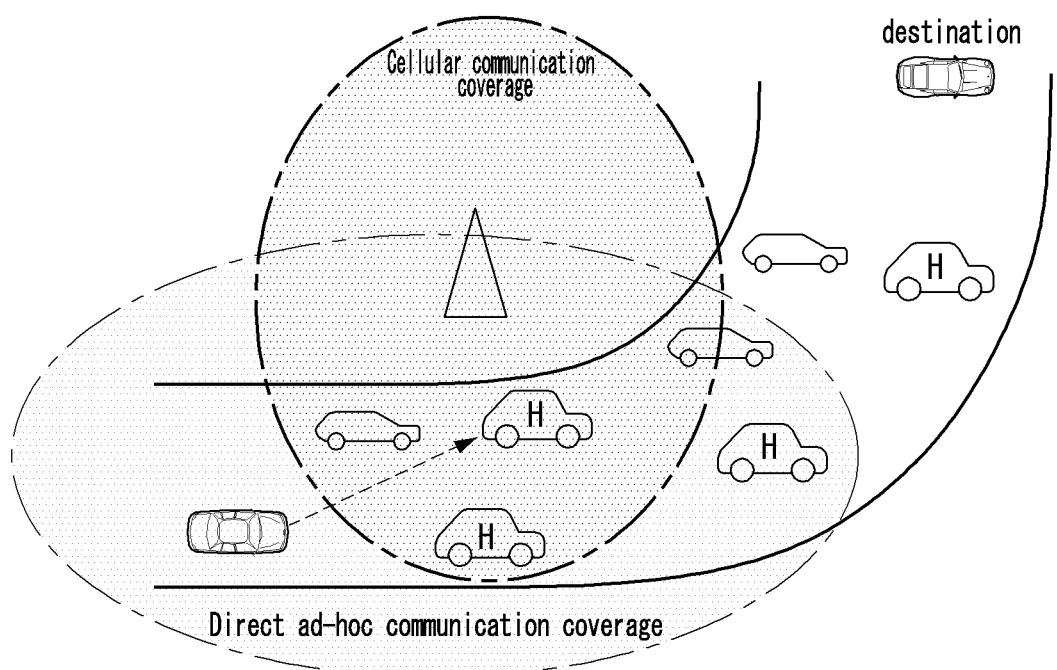
Enhanced Greedy Forwarding Algorithm for Hybrid communication #2 (EGF2)

[FIG. 20]
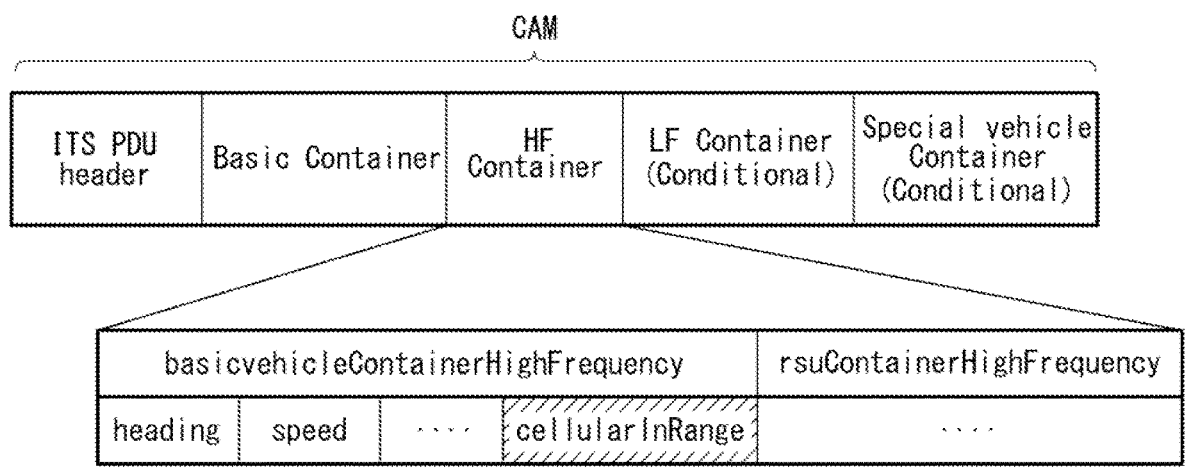

[FIG. 21]
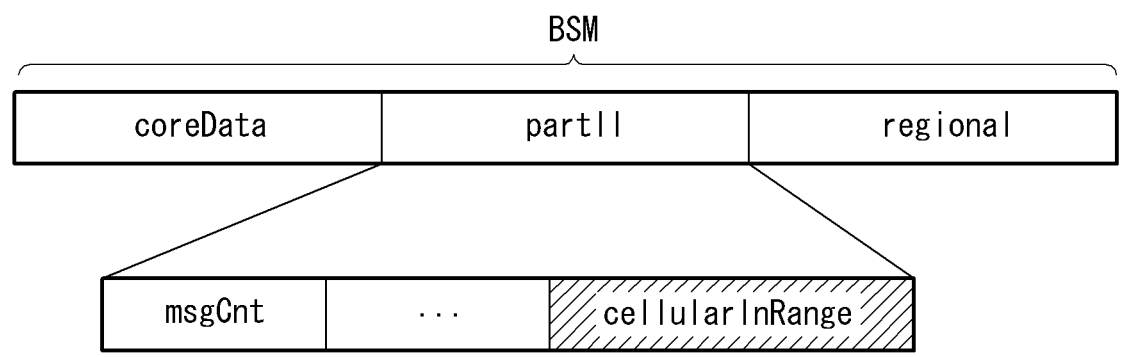

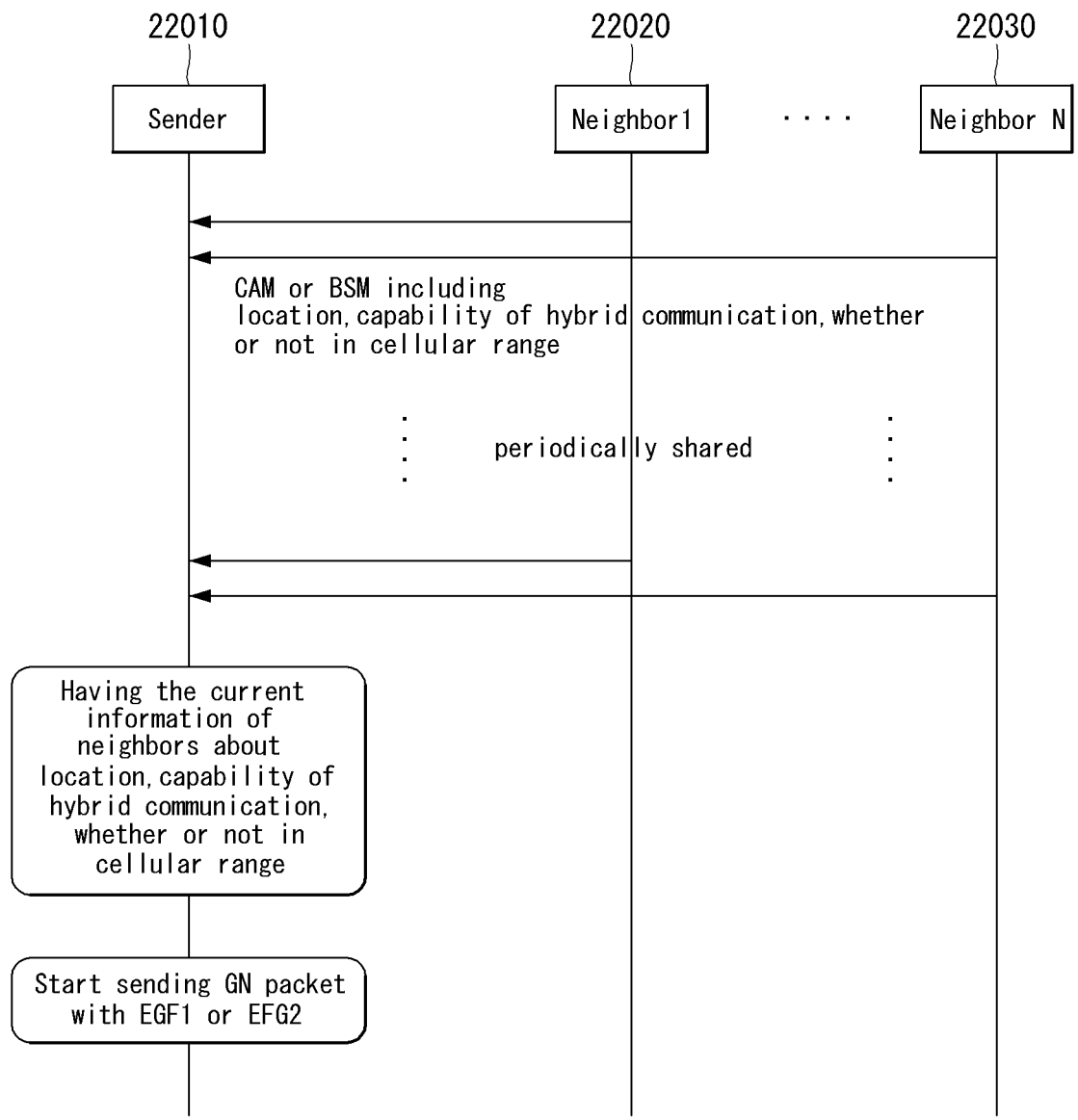

[FIG. 23]
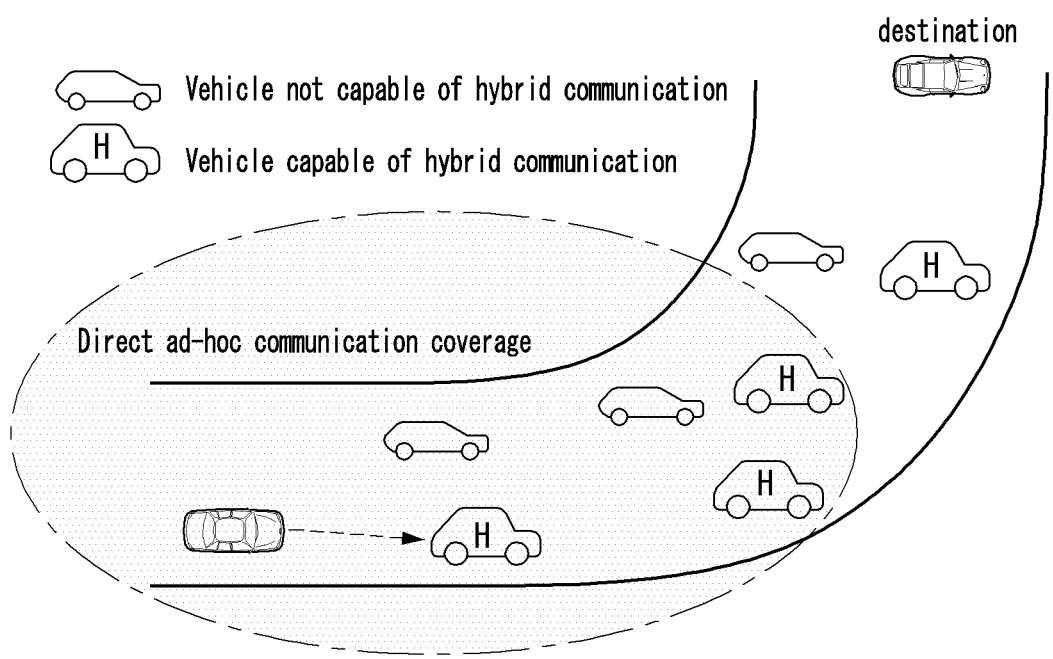
Sender Managed Forwarding Algorithm for Hybrid communication #1 (SMF1)

[FIG. 24]
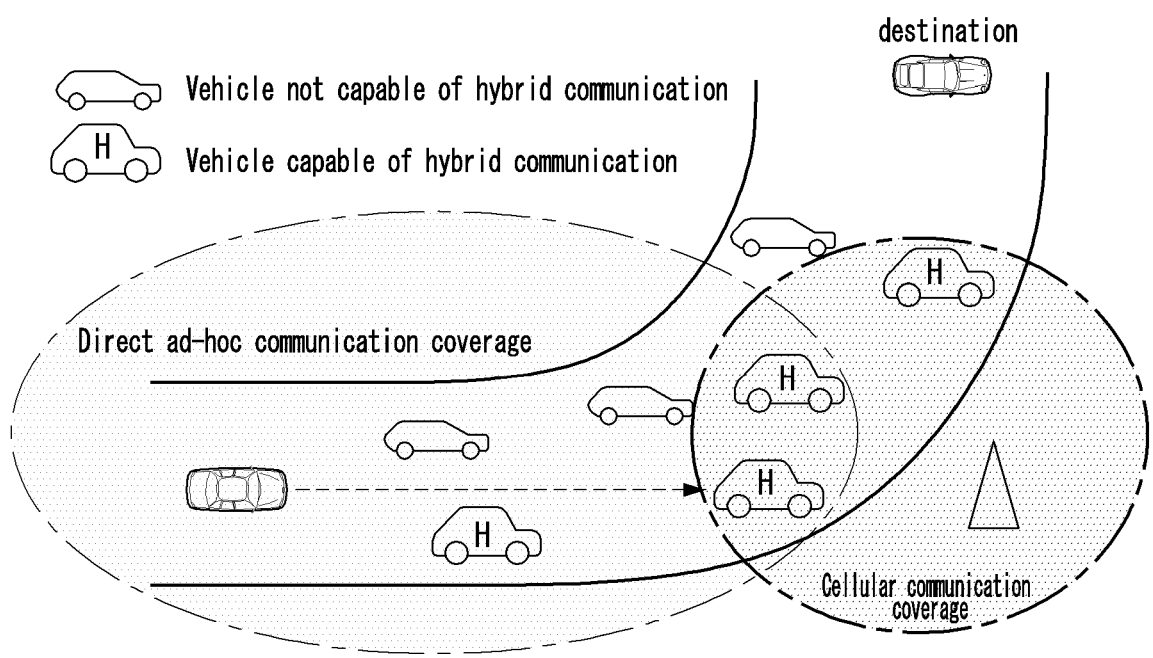
Sender Managed Forwarding Algorithm for Hybrid communication #2 (SMF2)

[FIG. 25]
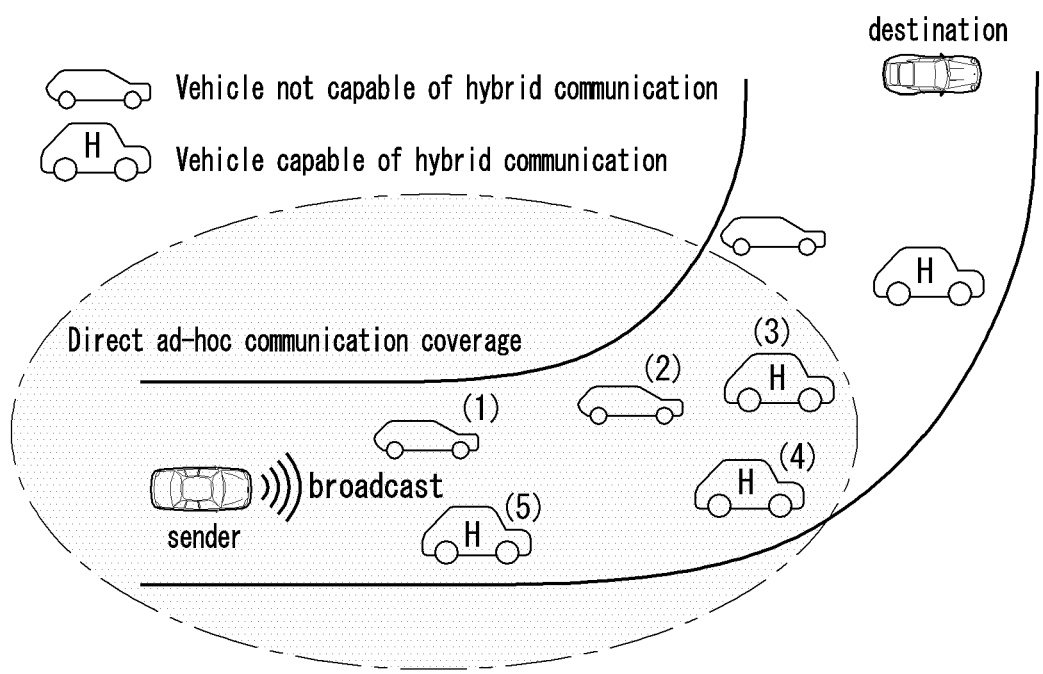
Enhanced Contention-based Forwarding Algorithm for Hybrid communication #1 (ECBF1)

[FIG. 26]
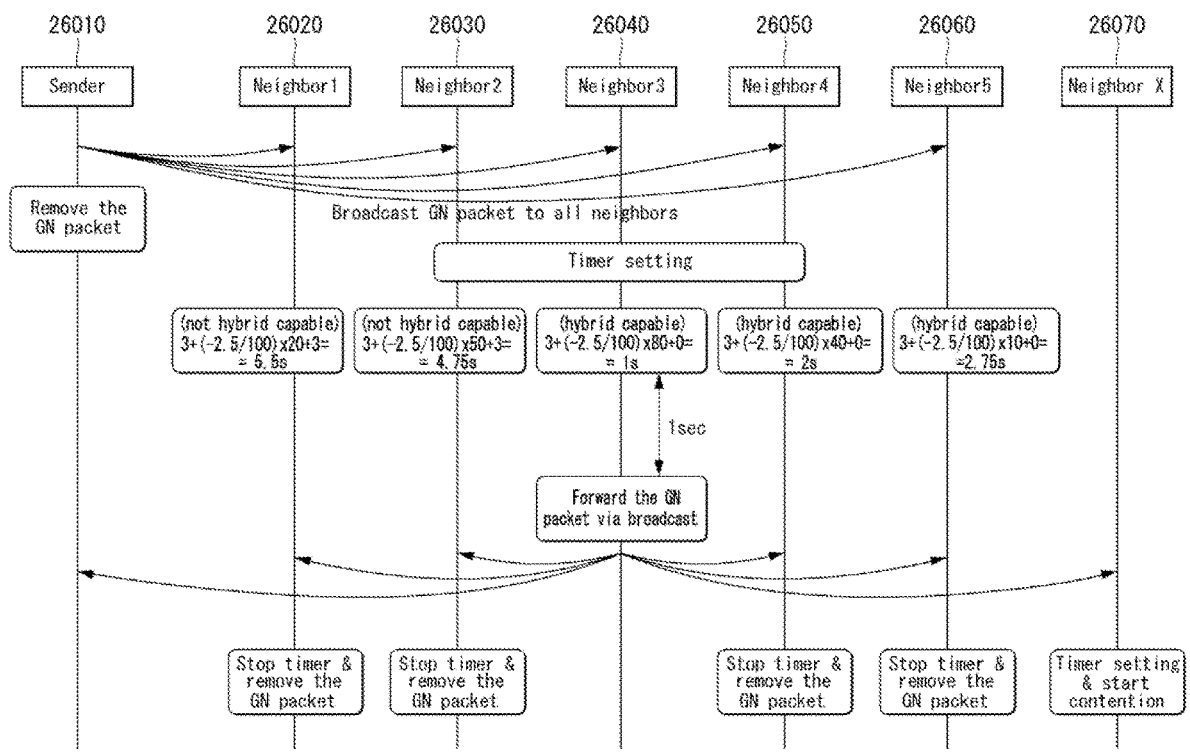

[FIG. 27]
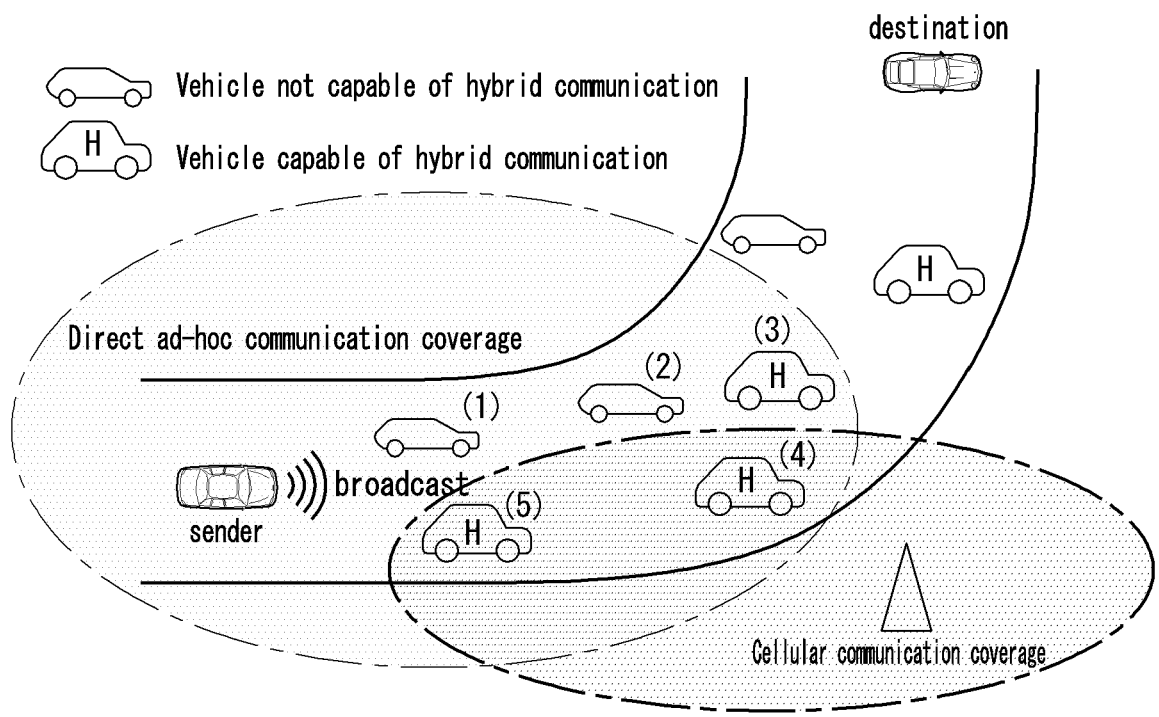
Enhanced Contention-based Forwarding Algorithm for Hybrid communication #2 (ECBF2)

[FIG. 28]
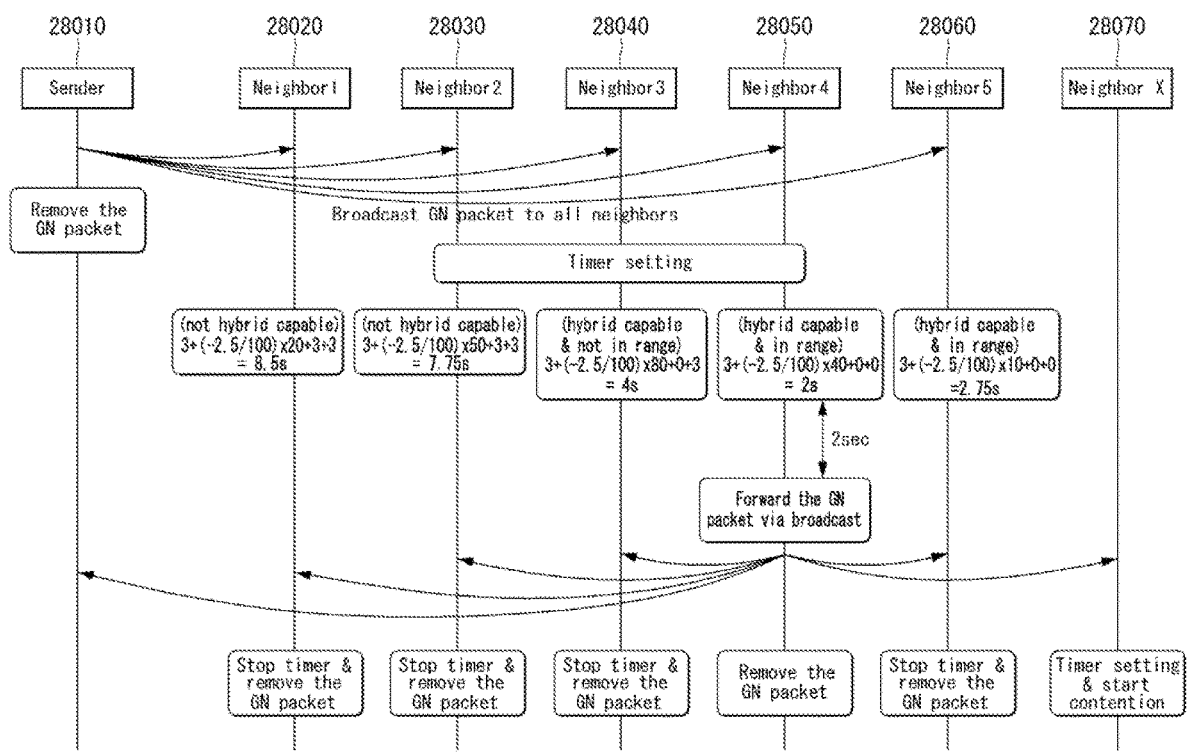

[FIG. 29]
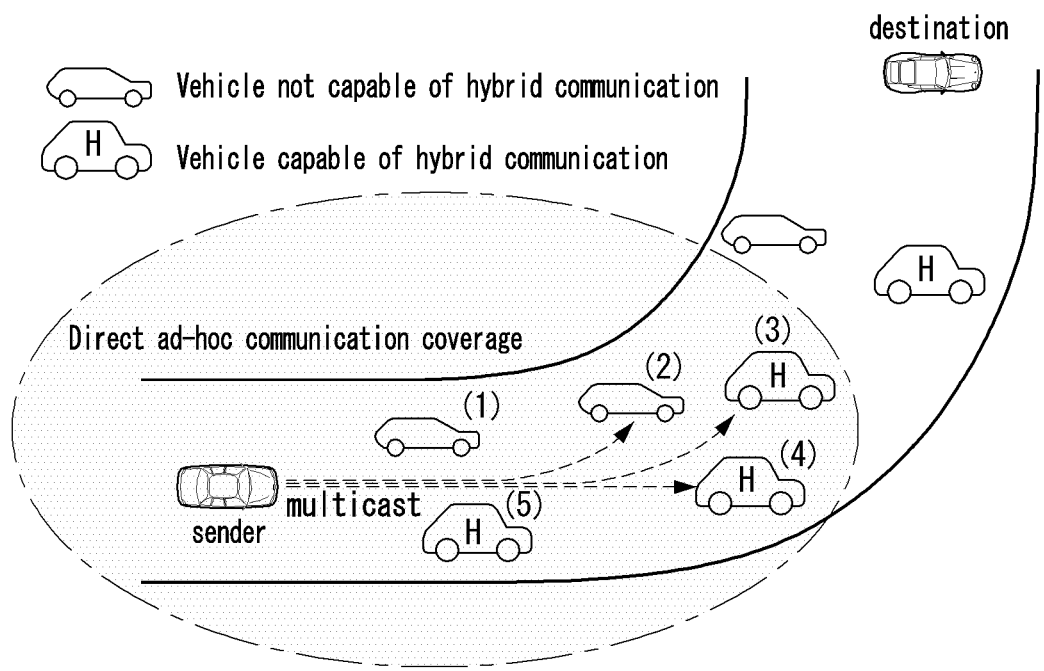
Combined Sender-based and Contention-based Forwarding Algorithm (CSCF)

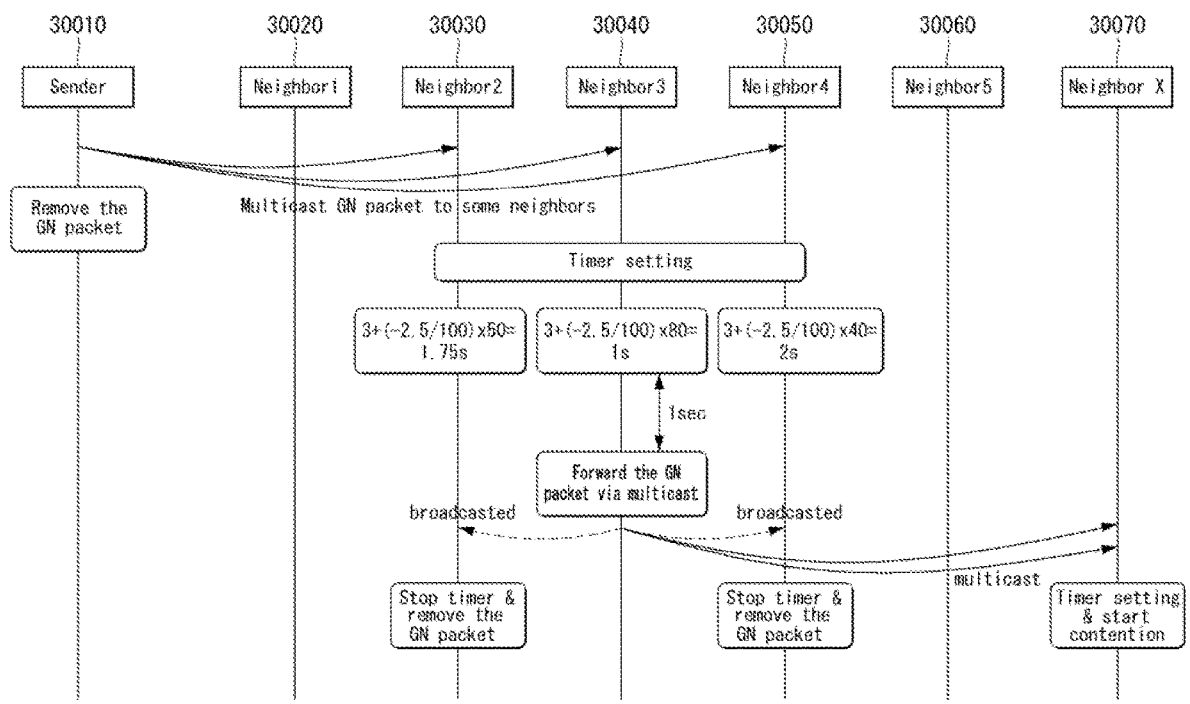
[FIG. 30]

[FIG. 31]
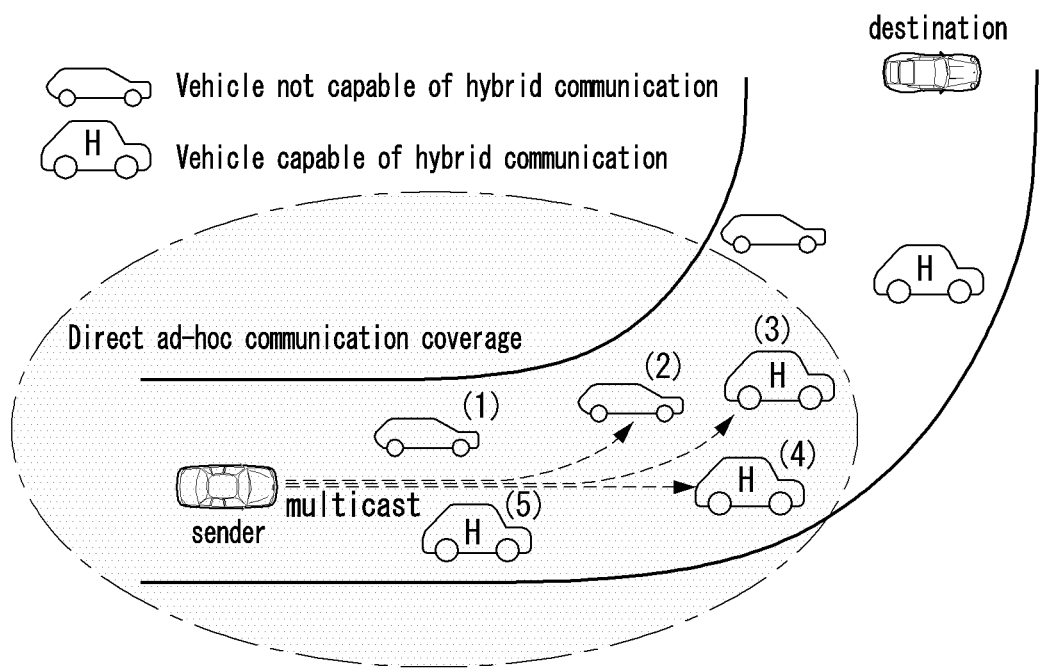
Enhance Combined Sender-based and Contention-based Forwarding Algorithm for Hybrid Communication #1 (ECSCF1)

[FIG. 32]
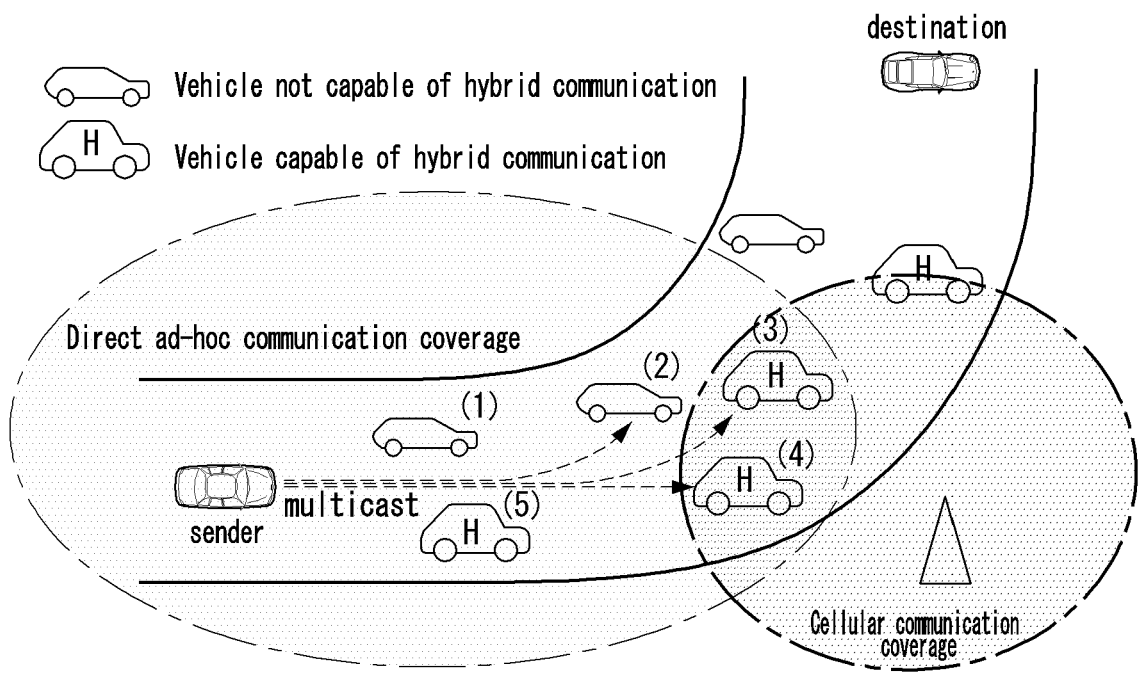
Enhance Combined Sender-based and Contention-based Forwarding Algorithm for Hybrid Communication #2 (ECSCF2)

[FIG. 33]

| GeoNetworking Common Header | | | | | | | | | | |
|---|---|---|---|---|---|---|---|---|---|---|
| NH | Rsv | HT | HST | TC (Traffic Class) | | | Flags | PL | MHL | Rsv |
| | | | | SCF | Channel Offload | TC ID | | | | |

[FIG. 34]
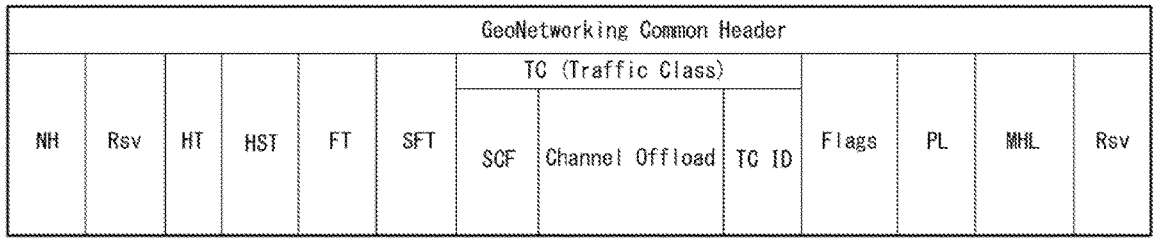
[FIG. 35]
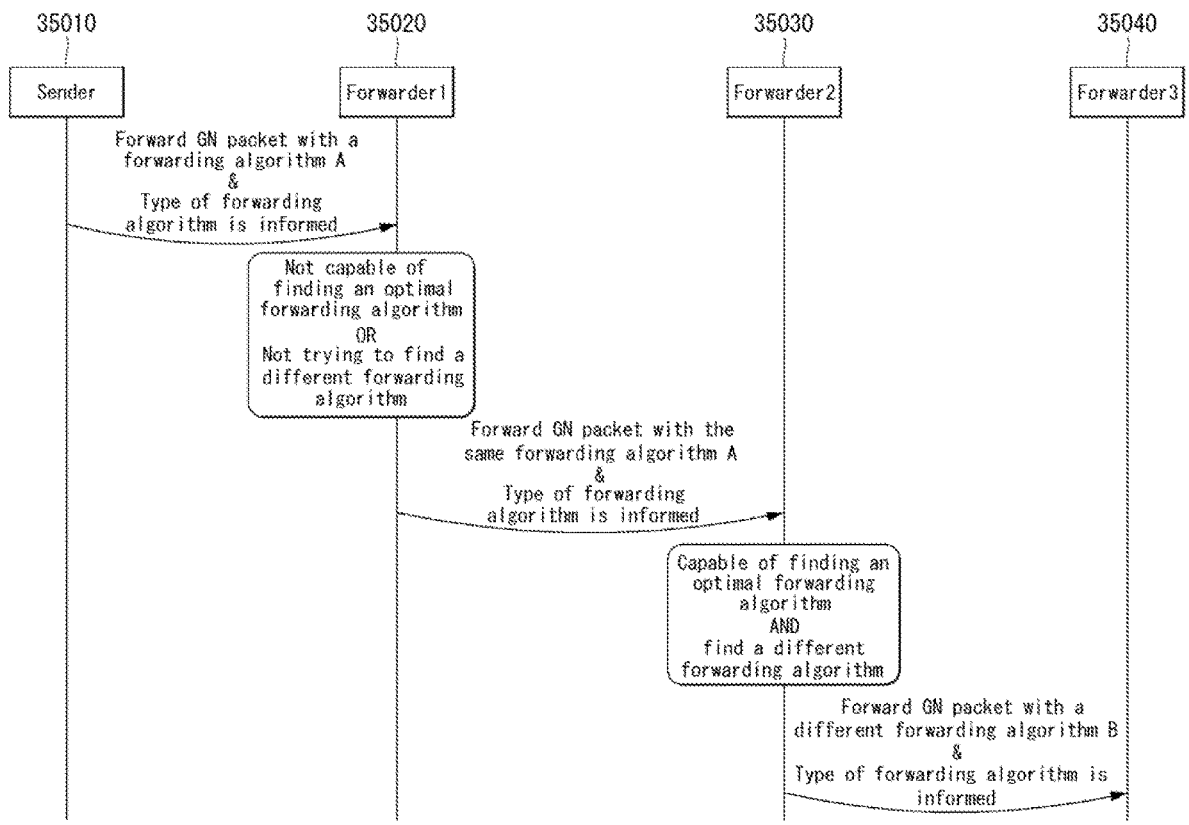

[FIG. 38]
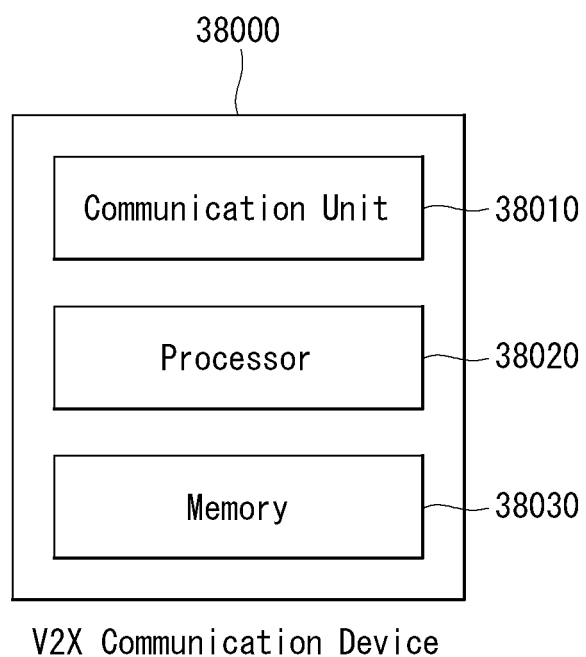
V2X Communication Device

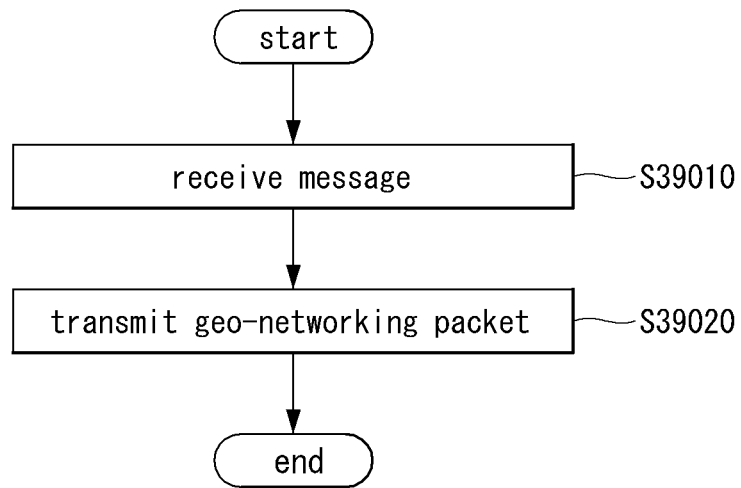
[FIG. 39]

V2X COMMUNICATION DEVICE AND GEO-NETWORKING TRANSMISSION METHOD

CROSS-REFERENCE TO RELATED APPLICATIONS

This application is the National Stage filing under 35 U.S.C. 371 of International Application No. PCT/KR2018/008309, filed on Jul. 23, 2018, the contents of which is hereby incorporated by reference herein in its entirety.

TECHNICAL FIELD

The disclosure relates to a V2X communication device and a geo-networking transmission method, and in particular, to a geo-networking transmission method using hybrid communication including direct communication and cellular communication.

BACKGROUND ART

In recent years, vehicles have become a result of complex industrial technology, which is a fusion of electric, electronic, and communication technologies, centering on mechanical engineering and the vehicle is also called a smart car in such an aspect. Smart cars have been providing various customized mobile services as well as traditional vehicle technology, such as traffic safety/complicatedness by connecting drivers, vehicles, and transportation infrastructures. The connectivity may be implemented using vehicle to everything (V2X) communication technology.

DETAILED DESCRIPTION OF THE DISCLOSURE

Technical Problem

Various services may be provided via V2X communication. A plurality of frequency bands are used to provide various services. Even in such an environment, high-reliable transfer and delivery of a safety service is a significant issue in light of the nature of vehicular communication.

In V2X communication, in order to transmit data out of the transmission range, a geo-networking transmission method using hopping may be used. In geo-networking transmission, a packet forwarding algorithm may be used for data hopping and destination delivery. In particular, in a V2X communication environment in which the communication environment dynamically changes, the efficiency and reliability of the packet forwarding algorithm need be considered.

Technical Solution

To address the foregoing issues, according to an embodiment of the disclosure, a method of geo-networking transmission using hybrid communication including direct communication and cellular communication comprises receiving a message from at least one neighboring vehicle and transmitting a geo-networking packet to the at least one neighboring vehicle. The transmission of the geo-networking packet may be performed based on at least one forwarding algorithm of a greedy-based forwarding algorithm, a sender-managed forwarding algorithm, or a contention-based forwarding algorithm.

In the geo-networking transmission method according to an embodiment of the disclosure, the received message may include hybrid capability information for the neighboring vehicle. The hybrid capability information may indicate whether the neighboring vehicle is capable of the hybrid communication.

In the geo-networking transmission method according to an embodiment of the disclosure, the received message may include cellular in range information. The cellular in range information may indicate whether the neighboring vehicle is within coverage of a cellular base station.

In the geo-networking transmission method according to an embodiment of the disclosure, the geo-networking packet may include forwarding algorithm type information. The forwarding algorithm type information may identify a type of forwarding algorithm through which the geo-networking packet is transmitted.

In the geo-networking transmission method according to an embodiment of the disclosure, the greedy-based forwarding algorithm may include at least one type of an enhanced greedy forwarding 1 (EFG1) algorithm or an enhanced greedy forwarding 2 (EFG2) algorithm, the sender managed forwarding algorithm may include at least one type of a sender managed forwarding 1 (SMF1) algorithm or a sender managed forwarding 1 (SMF2) algorithm, and the contention-based forwarding algorithm may include an enhanced contention-based Forward 1 (ECBF1) algorithm, an enhanced contention-based forward 2 (ECBF2) algorithm, a combined sender-based and contention-based forwarding (CSCF) algorithm, an enhance combined sender-based and contention-based forwarding 1 (ECSCF1) algorithm, or an enhance combined sender-based and contention-based forwarding 2 (ECSCF2) algorithm.

In the geo-networking transmission method according to an embodiment of the disclosure, when the transmission of the geo-networking packet is performed based on the contention-based forwarding algorithm, a buffering time of a timer for packet forwarding may be determined based on at least one of a hybrid communication capability of a receiver receiving the geo-networking packet or whether the receiver is within the cellular coverage.

To address the foregoing issues, according to an embodiment of the disclosure, a V2X communication device performing hybrid communication including direct communication and cellular communication comprises a memory storing data, a communication unit transmitting and receiving a wireless signal including a geo-networking packet and a processor controlling the memory and the communication unit. The processor receives a message from at least one neighboring vehicle and transmits a geo-networking packet to the at least one neighboring vehicle. The transmission of the geo-networking packet may be performed based on at least one forwarding algorithm of a greedy-based forwarding algorithm, a sender-managed forwarding algorithm, or a contention-based forwarding algorithm.

Advantageous Effects

The disclosure may reduce the number of hops required and solve the problems with geo-networking by using cellular technology. Since the number of hops required is reduced, the transmission reliability, the overall delivery delay and network traffic are enhanced. Reducing the number of hops may alleviate the problems with geo-networking protocols.

BRIEF DESCRIPTION OF DRAWINGS

The accompanying drawings, which are included to provide a further understanding of the disclosure and are incorporated in and constitute a part of this application, illustrate embodiments of the disclosure together with the detailed description serving to describe the principle of the disclosure.

FIG. 1 illustrates an intelligent transport system (ITS) according to an embodiment of the disclosure.

FIG. 2 illustrates a V2X transmission/reception system according to an embodiment of the disclosure.

FIG. 3 illustrates a configuration of a V2X system according to an embodiment of the disclosure.

FIG. 4 illustrates a packet structure of a network/transport layer according to an embodiment of the disclosure.

FIG. 5 illustrates a configuration of a V2X system according to another embodiment of the disclosure.

FIG. 6 illustrates a WSMP packet configuration according to an embodiment of the disclosure.

FIG. 7 illustrates a conceptual internal architecture of an MAC sublayer performing a multi-channel operation (MCO) according to an embodiment of the disclosure.

FIGS. 8(a) to 8(c) illustrate a geo-networking transmission method according to an embodiment of the disclosure.

FIGS. 9(a) to 9(c) illustrate a geo-networking transmission method using hybrid communication according to an embodiment of the disclosure.

FIG. 10 illustrates a use scenario for geo-networking using hybrid communication according to an embodiment of the disclosure.

FIGS. 11(a), and 11(b) illustrate a use scenario for geo-networking using hybrid communication according to an embodiment of the disclosure.

FIG. 12 illustrates a usage scenario for geo-networking using hybrid communication according to an embodiment of the disclosure.

FIG. 13 illustrates a basic forwarding algorithm using hybrid communication when a destination exists in the direct communication range of a sender.

FIG. 14 illustrates a basic forwarding algorithm using hybrid communication when a sender exists within the coverage of a cellular base station.

FIG. 15 illustrates a basic forwarding algorithm using hybrid communication when a destination exists within the coverage of a cellular base station.

FIG. 16 illustrates a use scenario of a first embodiment (EGF1) of an enhanced greedy forwarding algorithm according to an embodiment of the disclosure.

FIGS. 17(a), and 17(b) illustrate a configuration of a CAM according to an embodiment of the disclosure.

FIGS. 18(a), and 18(b) illustrate a configuration of a BSM according to an embodiment of the disclosure.

FIG. 19 illustrates a use scenario of a second embodiment (EGF2) of an enhanced greedy forwarding algorithm according to another embodiment of the disclosure.

FIG. 20 illustrates a configuration of a CAM according to an embodiment of the disclosure. FIG. 20 illustrates an embodiment in which cellular range information is included in an HF container. FIG. 20 illustrates an embodiment, in which the cellular range field may be included in a container/field different from that of FIG. 20.

FIG. 21 illustrates a configuration of a BSM according to an embodiment of the disclosure.

FIG. 22 is a flowchart illustrating a forwarding algorithm of EGF1 and/or EFG2 according to an embodiment of the disclosure.

FIG. 23 illustrates a use scenario of a first embodiment (SMF1) of a sender managed forwarding algorithm according to an embodiment of the disclosure.

FIG. 24 illustrates a use scenario of a second embodiment (SMF2) of a sender managed forwarding algorithm according to an embodiment of the disclosure.

FIG. 25 illustrates a use scenario of a first embodiment (EFBF1) of an enhanced contention-based forwarding algorithm for hybrid communication.

FIG. 26 is a view illustrating an execution operation of an ECVF1 algorithm according to the embodiment of FIG. 25.

FIG. 27 illustrates a use scenario of a second embodiment (EFBF2) of an enhanced contention-based forwarding algorithm for hybrid communication.

FIG. 28 is a view illustrating an execution operation of an ECVF2 algorithm according to the embodiment of FIG. 26.

FIG. 29 illustrates a use scenario of a Combined Sender-based and Contention-based Forwarding (CSCF) algorithm according to an embodiment of the disclosure.

FIG. 30 is a view illustrating an execution operation of a CSCF algorithm according to the embodiment of FIG. 29.

FIG. 31 illustrates a first embodiment of an Enhance Combined Sender-based and Contention-based Forwarding (ECSCF) algorithm using hybrid communication according to an embodiment of the disclosure.

FIG. 32 illustrates a second embodiment of an Enhance Combined Sender-based and Contention-based Forwarding (ECSCF) algorithm using hybrid communication according to an embodiment of the disclosure.

FIG. 33 illustrates a configuration of a common header of a geo-networking packet according to an embodiment of the disclosure.

FIG. 34 illustrates a configuration of a common header of a geo-networking packet according to an embodiment of the disclosure.

FIG. 35 illustrates propagation of forwarding type information according to an embodiment of the disclosure.

FIG. 38 illustrates a V2X communication device according to an embodiment of the disclosure.

FIG. 39 illustrates a geo-networking transmission method using hybrid communication including direct communication and cellular communication according to an embodiment of the disclosure.

MODE FOR CARRYING OUT THE DISCLOSURE

Figure 36I:
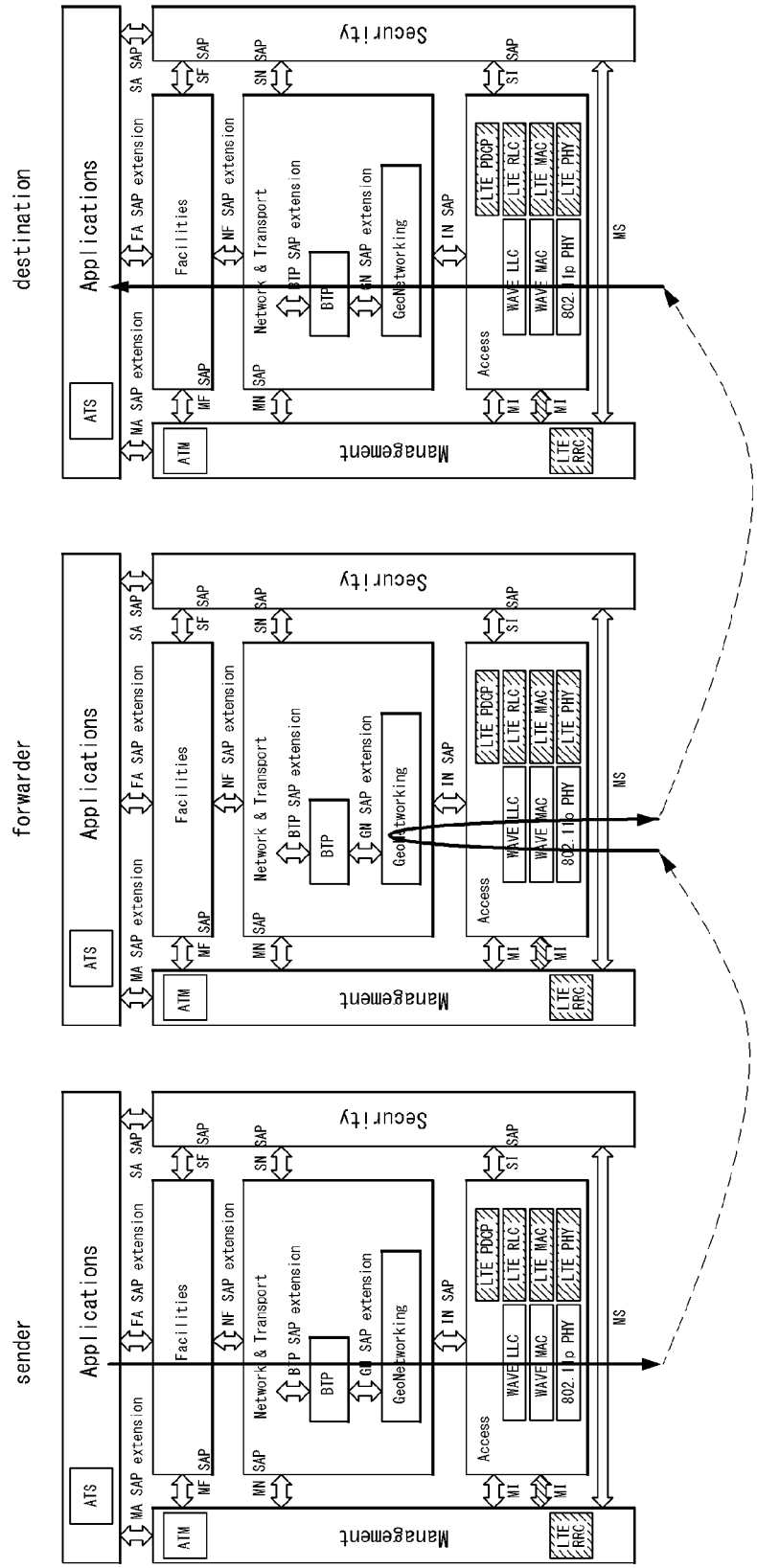
FIG. 36 illustrates an information flow when a cellular network is not available according to an embodiment of the disclosure.

Preferred embodiments of the disclosure are described in detail and examples thereof are illustrated in the accompanying drawings. The following detailed description with reference to the accompanying drawings is intended to illustrate the preferred embodiments of the disclosure rather than merely illustrating embodiments that may be implemented according to embodiments of the disclosure. The following detailed description includes details in order to provide a thorough understanding of the disclosure, but the disclosure does not require all of these details. In the disclosure, respective embodiments described below need not be particularly used separately. Multiple embodiments or all embodiments may be together used and specific embodiments may be used as a combination.

Most of the terms used in the disclosure are selected from the general ones that are widely used in the field, but some terms are arbitrarily selected by the applicant and the meaning thereof will be described in detail in the following description, as necessary. Accordingly, the disclosure should be understood based on the intended meaning of the term rather than the mere name or meaning of the term.

The disclosure relates to a V2X communication apparatus and the V2X communication apparatus is included in an Intelligent Transport System (ITS) to perform all or some functions of the ITS. The V2X communication apparatus may communicate with vehicles and vehicles, vehicles and infrastructure, vehicles and bicycles, and mobile devices. The V2X communication apparatus may be abbreviated as a V2X apparatus. As an embodiment, the V2X apparatus may correspond to an on board unit (OBU) of the vehicle or may be included in the OBU. The OBU may also be referred to as on a board equipment (OBE). The V2X apparatus may correspond to a roadside unit (RSU) of the infrastructure or may be included in the RSU. The RSU may also be referred to as a roadside equipment (RSE). Alternatively, the V2X communication apparatus may correspond to an ITS station or may be included in the ITS station. All of a predetermined OBU, a predetermined RSU, and a predetermined mobile equipment that perform V2X communication may also be referred to as the ITS station or the V2X communication apparatus.

FIG. 1 illustrates an intelligent transport system (ITS) according to an embodiment of the disclosure.

The intelligent transport system means a system that provides an efficient and safe transport service by applying information and communication technology such as an electronic control and communication device to transportation means such as automobiles, buses, trains, or the like and transportation facilities including traffic lights, an electronic display board, and the like. In order to support the ITS, vehicle to everything (V2X) technology may be used. V2X communication technology represents communication technology between vehicles or between the vehicle and a peripheral device.

A vehicle that supports V2X communication is equipped with the OBU and the OBU includes a dedicated short-range communication (DSRC) communication modem. An infrastructure including a V2X module installed around a road, such as the traffic light, may be referred to as an RSU. Vulnerable road users (VRUs) are transportation weakness and pedestrians, bicycles, wheelchairs, etc. may correspond to the VRUs. The VRU may perform V2X communication.

Vehicle to vehicle (V2V) refers to inter-vehicle communication or communication technology including a V2X communication apparatus. Vehicle to infra-structure (V2I) refers to communication or communication technology between the vehicle and an infra-structure including the V2X communication apparatus. Besides, communication between the vehicle and the transportation weakness may refer to V2O and communication between the infra-structure and the transportation weakness may refer to I2O.

FIG. 2 illustrates a V2X transmission/reception system according to an embodiment of the disclosure.

A V2X transmission/reception system includes a V2X transmitter 2100 and a V2X receiver 2200 and the transmitter and the receiver are distinguished from each other according to roles of transmitting and receiving data and are not different from each other in a configuration of a device. The V2X transmitter 2100 and the V2X receiver 2200 are both the V2X communication apparatuses.

The V2X transmitter 2100 includes a Global Navigation Satellite System (GNSS) receiver 2110, a DSRC radio 2120, a DSRC device processor 2130, an application Electronic Control Unit (ECU) 2140, a sensor 2150, and a human interface 2160.

The DSRC radio 2120 may perform communications based on the IEEE 802.11 standard based on a Wireless Local Area Network (WLAN) and/or the Wireless Access in Vehicular Environments (WAVE) standard of the Society of Automotive Engineers (SAE). The DSRC radio 2120 may perform operations of a physical layer and an MAC layer.

The DSRC device processor 2130 may decode a message received by the DSRC radio 2120 or decode a message to be transmitted. The GNSS receiver 2110 may process GNSS and acquire positional information and temporal information. As an example, the GNSS receiver 2110 may become a Global Positioning System (GPS) device.

The application ECU 2140 may be a microprocessor for providing a specific application service. The application ECU may generate an operation/message based on sensor information and a user input in order to provide a service and transmit/receive the message by using the DSRC device processor. The sensor 2150 may obtain vehicle status and ambient sensor information. The human interface 2160 may receive a user's input or display/provide the message through an interface such as an input button or a monitor.

The V2X receiver 2200 includes a Global Navigation Satellite System (GNSS) receiver 2210, a DSRC radio 2220, a DSRC device processor 2230, an application Electronic Control Unit (ECU) 2240, a sensor 2250, and a human interface 2260. The aforementioned description of the configuration of the V2X transmitter 2100 is applied to the configuration of the V2X receiver 2200.

The DSRC radio and the DSRC device processor correspond to one embodiment of a communication unit. The communication unit may perform communication based on cellular communication technology such as 3GPP and Long Term Evolution (LTE).

FIG. 3 illustrates a configuration of a V2X system according to an embodiment of the disclosure.

As an embodiment, the V2X system of FIG. 3 may correspond to an ITS station reference architecture defined in ISO 21217/EN302 665. In FIG. 3, the ITS station illustrates an example of an ITS station based on a reference architecture. FIG. 3 illustrates a hierarchical architecture for end-to-end communication. When a vehicle-to-vehicle message is communicated, the message is passed through each layer one layer down in a transmitting vehicle/ITS system and the message is delivered to an upper layer one layer up in a receiving vehicle/ITS system. The description of each layer is as follows.

Application layer: The application layer may implement and support various use cases. For example, an application may provide road safety, efficient traffic information, and other application information.

The application layer may classify and define the ITS application and provide an end vehicle/user/infra-structure through the lower layer. The application may be defined/applied for each user case or the use-case may be grouped and defined/applied like the road safety, traffic efficiency, a local service, and infotainment. As an embodiment, application classification, the use-case, and the like may be updated when a new application scenario is generated. Layer management may manage and serve information related to an operation and a security of the application layer. The information and the service may be bidirectionally delivered and shared through an interface between MAMA (management entity and application layer and SA (interface between security entity and ITS-S applications) or service access point (SAP) (e.g., MA-SAP and SA-SAP). A request from the application layer to a facility layer or information delivery from the facility layer to the application layer may be performed through FA (interface between facilities layer and ITS-S applications) (or FA-SAP).

Facilities layer: The facility layer may support various use-cases defined in the application layer so as to effectively implement various use-cases. For example, the facility layer may perform application support, information support, and session/communication support.

The facility layer may basically support functions of a session layer, a presentation layer, and an application layer which are top three layers. The facility layer may additionally provide evolved facilities such as the application support, the information support, and the session/communication support for the ITS system. The facility means a component that provides functionality, information, and data.

The facilities may be classified into a common facility and a domain facility. The common facility may provide a core service or function required for a basic application set of the ITS and an operation of the ITS station. For example, time management, position management, service management, and the like may be provided. The domain facility may provide a special service or function to the basic application set of one or plural ITSs. For example, the domain facility may provide DEcentralized Notification Messages (DENM) management for Road Hazard Warning applications (RHW). When the domain facility as an optional function is not supported by the ITS station, the domain facility may not be used.

Networking & Transport layer: The network/transport layer may configure a network for vehicle communication between homogeneous/heterogeneous networks by using various transport protocols and network protocols. For example, the networking/transport layer may provide Internet connection and routing using an Internet protocol such as TCP/UDP+IPv6 or the like. Alternatively, the networking/transport layer may configure a vehicle network by using a geographical position based protocol such as a basic transport protocol (BTP)/geo-networking.

The transport layer corresponds to a connection layer between services providing upper layers (session layer, presentation layer, and application layer) and lower layers (network layer, data link layer, and physical layer). The transport layer serves to manage data sent by a user to accurately arrive at a destination. At a transmitting side, the transport layer may serve to split data into packets having an appropriate size for transmission for efficient data transmission. At a receiving side, the transport layer may serve to recombine the received packets into an original file. As an embodiment, the transport protocol may adopt TCP/UDP and a transport protocol for ITS such as VTS may be used.

The network layer may allocate a logical address and decide a packet transfer path. The network layer may receive a packet generated by the transport layer and add a network header including the logical address of the destination. As an example of a packet path design, unicast/broadcast may be considered between the vehicles, between the vehicle and a fixation station, and between fixation stations. As an embodiment, as the network protocol for the ITS, a protocol such as geo-networking, IPv6 networking with mobility support, IPv6 over geo-networking, or the like may be considered.

Access layer: The access layer may transmit messages/data received by the upper layer through a physical channel. For example, the access layer may perform/support data communication based on IEEE 802.11 and/or 802.11p standard-based communication technology, ITS-G5 wireless communication technology based on physical transmission technology of the IEEE 802.11 and/or 802.11p standards, 2G/3G/4G (LTE)/5G wireless cellular communication technology including satellite/broadband wireless mobile communication, broadband terrestrial digital broadcasting technology such as DVB-T/T2/ATSC, GPS technology, IEEE 1609 WAVE technology, and the like.

The ITS system for vehicle communication and networking may be organically designed in consideration of various access technologies, network protocols, and communication interfaces for providing various use-cases. Further, the role and the function of each layer may be enhanced or reinforced.

FIG. 4 illustrates a packet structure of a network/transport layer according to an embodiment of the disclosure.

FIG. 4 illustrates a packet structure of the network/transport layer, and the transport layer may generate a BTP packet and the network layer may generate a geo-networking packet. The geo-networking packet corresponds to data of a logical link control (LLC) packet to be included in the LLC packet. The geo-networking packet may be encapsulated into the LLC packet. In an embodiment of FIG. 4, the data may include a message set and the message set may become a basic safety message.

The BTP is a protocol for transmitting the message such as the CAM or DENM generated by the facility layer to the lower layer. The BTP header is constituted by A type and B type. An A type BTP header may include a destination port and a source port required for transmission/reception for interactive packet transmission. AB type BTP header may include the destination port and destination port information required for transmission for non-interactive packet transmission. The description of a field/information included in the header is as follows.

Destination port: The destination port identifies a facility entity corresponding to the destination of data (BTP-PDU) included in the BTP packet.

Source port: as a field generated in the case of BTP-A type, indicates a port of a protocol entity of the facility layer in a source in which the corresponding packet is transmitted. This field may have a size of 16 bits.

Destination port Information: as a field generated in the case of BTP-B type, may provide additional information when the destination port is a most well-known port. This field may have the size of 16 bits.

The geo-networking packet includes a basic header and a common header according to the protocol of the network layer and optionally includes an extension header according to a geo-networking mode.

The basic header may be 32 bits (4 bytes). The basic header may include at least one of a version field, a next header (NH) field, a lifetime (LT) field, and a remaining hop limit (RHL) field. The description of the fields included in the basic header is as follows. A bit size configuring each field is just an embodiment and may be modified.

Version (4 bits): A version field indicates a version of the geo-networking protocol.

NH (4 bits): A next header (NH) field indicates a type of subsequent header/field. When a field value is 1, the common header may be followed and when the field value is 2, a secured packet in which the security is configured may be followed.

LT (8 bits): A lifetime (LT) field indicates a maximum survival time of the corresponding packet.

RHL (8 bits): A remaining hop limit (RHL) field indicates a remaining hop limit. An RHL field value may be reduced by one for each forwarding on a GeoAdhoc router. When the RHL field value is 0, the corresponding packet is not forwarded any longer.

The common header may be 64 bits (8 bytes). The common header may include at least one of a next header (NH) field, a header type (HT) field, a header sub-type (HST) field, a header sub-type (HST) field, a traffic class (TC) field, a flags field, a payload length (PL) field, and a maximum hop limit (MHL) field. The description of each of the fields is as follows.

NH (4 bits): The next header (NH) field indicates the type of subsequent header/field. When the field value is 0, the NH field may indicate "ANY" type which is not defined, when the field value is 1, the NH field may indicate a BTP-A type packet, when the field value is 2, the NH field may indicate a BTP-B type, and when the field value is 3, the NH field may indicate an IP diagram of IPv6.

HT (4 bits): The header type field indicates a geo-networking type. The geo-networking type includes Beacon, GeoUnicast, GeoAnycast, GeoBroadcast, Topologically-Scoped Broadcast (TSB), and Location Service (LS).

HST (4 bits): The header sub type field indicates a detailed type together with the header type. As an embodiment, when the HT type is set to the TSB, the HST may indicate a single hop for the HST value of '0' and a multi-hop for the HST value of '1'.

TC (8 bits): The traffic class field may include Store-Carry-Forward (SCF), channel offload, and TC ID. The SCF field indicates whether to store the packet when there is no neighbor to which the packet is to be transferred. The channel offload field indicates that the packet may be transferred to another channel in the case of a multi-channel operation. The TC ID field as a value allocated when transferring the packet in the facility layer may be used for setting a contention window value in the physical layer.

Flag (8 bits): The flag field indicates whether the ITS apparatus is mobile or stationary and as an embodiment, the flag field may become last 1 bit.

PL (8 bits): The payload length field indicates a data length subsequent to the geo-networking header in units of bytes. For example, in the case of the geo-networking packet that carries the CAM, the PL field may indicate the BTP header and the length of the CAM.

MHL (8 bits): The Maximum Hop Limit (MHL) field may indicate a maximum hopping number.

The LLC header is added to the geo-networking packet to generate the LLC packet. The LLC header provides a function to distinguish and transmit IP data from geo-networking data. The IP data and the geo-networking data may be distinguished by Ethertype of SNAP. As an embodiment, when the IP data is transmitted, the Ethertype may be set to 0x86DD and included in the LLC header. As an embodiment, when the geo-networking data is transmitted, the Ethertype may be set to 0x86DC and included in the LLC header. The receiver may verify the Ethertype field of the LLC packet header and forward and process the packet to an IP data path or a geo networking path according to the value.

FIG. 5 illustrates a configuration of a V2X system according to another embodiment of the disclosure.

FIG. 5 illustrates a hierarchical architecture corresponding to another embodiment of the V2X system of FIG. 3. As an embodiment, the North American V2X system uses IEEE 802.11 PHY technology and MAC technology, and further may use the MAC technology of IEEE 1609.4. In the network/transport layer technology, the technology of the IEEE802.2 standard may be applied to an LLC block and the IEEE 1609.3 technology may be applied to a WAVE short message protocol (WSMP). The facility layer may use a message set of a J2735 standard of SAE and the application layer may use an application defined for V2V, V2I, and V2O in a J2945 standard.

The application layer may perform a function to implement and support the use-case. The application may be optionally used according to the use-case. A system requirement of each use-case may be defined in the J2945 standard. J2945/1 defines an application of V2V technology such as V2V safety communication.

A J2945/1 document defines applications including emergency electronic brake lights (EEBL), forward crash warning (FCW), blind spot warning (BSW), lane change warning (LCW), intersection movement assist (IMA), and control loss warning (CLW). As an embodiment, FCW technology is V2V safety communication technology that warns of a collision with a preceding vehicle. When a vehicle equipped with the V2X communication apparatus makes emergency stop or crashes, an FCW safety message may be transmitted in order to prevent a collision of a subsequent vehicle. The subsequent vehicle may receive FCW messages and alert a driver or perform such controls as speed deceleration or lane change. In particular, even when there is another vehicle between a stopped vehicle and a driving vehicle, it is possible to determine a state of the stopped through the FCW. The FCW safety message may include positional information (latitude, longitude, and lane) of the vehicle, vehicle information (vehicle type, length, direction, speed), and event information (stop, sudden stop, and slow down) and the information may be generated by the request of the facility layer.

The facility layer may correspond to OSI layer 5 (session layer), layer 6 (presentation layer), or layer 7 (application layer). The facility layer may generate the message set according to a situation in order to support the application. The message set may be defined in the J2735 standard and described/decoded through ASN.1. The message set may include a BasicSafetyMessage message, a MapData message, a SPAT message, CommonSafetyRequest message, an EmergencyVehicleAlert message, an IntersectionCollision message, a ProbeVehicleData message, a RoadSideAlert message, and a PersonalSafetyMessag message.

The facility layer collects the information to be transmitted from the upper layer to generate the message set. The message set may be displayed in an Abstract Syntax Notation 1 (ASN.1) scheme. The ASN.1 as a notation used to describe the data structure may also set an encoding/decoding rule. The ASN.1 does not depend on specific devices, a data representation scheme, programming languages, hardware platforms, and so on. The ASN.1 as a language for describing data regardless of platform is a joint standard between Consultative Committee on International Telegraphy and Telephony (CCITT) X.208 and International Organization for Standardization, (ISO) 8824.

The message set as a collection of messages related to V2X operations and there is a message set appropriate to the context of the upper application. The message set may be expressed in a format of the data frame and may include at least one element. Each element may include the data frame or a data element.

The data frame represents two or more data sequences. The data frame may become a sequence structure of the data element or a sequence structure of the data frame. As an embodiment, DV_vehicleData as a data frame structure representing information of a vehicle may include a plurality of data elements (for example, Height, Bumbers, mass, and trailerweight). The data element defines a description of the data element. As an embodiment, an element called Height used in the data frame is defined in DE_VehicleHeight and may express a height of the vehicle. As an embodiment, the height of the vehicle may be expressed from 0 to 127, and an LBS unit may be increased by 5 cm and be expressed up to 6.35 meters.

As an embodiment, a basic safety message (BasicSafetyMessage) may be transmitted. The BasicSafetyMessage as a most basic and important message in the message set is used for periodically transmitting basic information of the vehicle. The corresponding message may include coreData defined as BSMcoreData, PartII which is optional, and regional data. The coreData may include data elements including msgCnt, id, lat, long, elev, speed, deading, break, size, and the like. The coreData uses the data elements to display a message count, ID, latitude, longitude, altitude, speed, direction, a brake, a vehicle size, and so on. The corresponding BSM may generally transmit information corresponding to the coreData in a period of 100 msec (10 times per second).

The network/transport layer may correspond to OSI layer 3 (network layer) and layer 4 (transport layer). A WAVE short message protocol (WSMP) may be used for transmitting a WAVE Short Message (WSM) delivered by the upper layer. Additionally, an IPv6/TCP may be used for processing an IP signal in the related art. The LLC block may adopt the IEEE 802.2 standard and may distinguish IP diagrams from WSM packets.

The access layer may correspond to OSI layer 1 (physical layer) and OSI layer 2 (data link layer). The access layer may use PHY technology and MAC technology of IEEE 802.11 and additionally use MAC technology of IEEE 1609.4 in order to support vehicle communication.

The security entity and the management entity may be connected and operated in all intervals.

FIG. 6 illustrates a WSMP packet configuration according to an embodiment of the disclosure.

The network/transport layer of FIG. 5 may transmit a vehicle security message such as the BSM via the WSMP. The WSMP is described in an IEEE 1609.3 document and may also support the Ipv6 and the TCP/UDP in order to additionally transmit the IP data.

The WSMP is a protocol for delivering the WAVE short message generated in the ASN.1 scheme in the facility layer to the lower layer. As illustrated in FIG. 6, the WSMP packet includes the WSMP header and the WSM data including the message. The WSMP header includes a version field, a PSID field, an extension field, a WSM WAVE element ID field, and a length field.

The version field may be defined as a Wsmp Version field indicating an actual WSMP version of 4 bits and a reserved field of 4 bits. The PSID field as a provider service identifier may be allocated according to the application in the upper layer. The PSID field helps deciding an appropriate upper layer at the receiver side. The extension field is a field for extending the WSMP header and information including a channel number, data rate, transmit power used, and the like may be inserted into the extension field. The WSMP WAVE element ID field may designate a type of transmitted WAVE short message. The length field may designate a length of the WSM data transmitted through a WSMLength field of 12 bits in units of octets.

The LLC header provides a function to distinguish and transmit the IP data from the WSMP data. The IP data and the WSMP data may be distinguished by Ethertype of SNAP. As an embodiment, the LLC header and SNAP header structures may be defined in the IEEE 802.2 document. As an embodiment, when the IP data is transmitted, the Ethertype may be set to 0x86DD and included in the LLC header. As an embodiment, when the WSMP data is transmitted, the Ethertype may be set to 0x86DC and included in the LLC header. The receiver may verify the Ethertype field of the LLC packet header and forward and process the packet to an IP data path or a WSMP path according to the value.

FIG. 7 illustrates a conceptual internal architecture of an MAC sublayer performing a multi-channel operation (MCO) according to an embodiment of the disclosure.

As an embodiment, the architecture of FIG. 7 may be included in the access layer of FIG. 5 or included in the MAC layer of the access layer. The MCO structure of FIG. 7 may include channel coordination in which a channel access is defined, channel routing in which operation processes of overall data and a management frame between PHY-MAC layers are defined, Enhanced Dedicated Channel Access (EDCA) of deciding and defining the priority of the transmission frame and a data buffer (or queue) storing the frame received by the upper layer. A channel coordination block is not illustrated in FIG. 7 and the channel coordination may be performed by the entirety of an MAC sublayer of FIG. 5.

Channel coordination: As an embodiment, channel accesses to a control channel (CCH) and a service channel (SCH) may be controlled. A channel access coordination will be described below. As an embodiment, the Wave short message (WSM) may be transmitted as (via) the CCH and the WSM and/or IP data may be transmitted as the SCH.

Data buffer (queue): The data buffer may store the data frame received from the upper layer according to defined access category (AC). In the embodiment of FIG. 3, the data buffer may be provided for each AC.

Channel routing: A channel routing block may deliver data input in the upper layer to the data buffer. Transmission operation parameters such as the channel number, the transmit power, and the data rate for the channel coordination and the frame transmission may be called with respect to a transmission request of the upper layer.

EDCA: As a scheme for guaranteeing QoS in the IEEE 802.11e MAC layer in the related art is a contention based medium access scheme that divides the AC into four access categories (AC) according to a type of traffic and assigns different priorities for each category and allocates different parameters for each AC and gives more transmission opportunities to traffic having a higher priority. An EDCA block may designate 8 priorities of 0 to 7 for data transmission including the priority and data which reach the MAC layer may be mapped to four ACs according to the priority.

The control channel (CCH) refers to a radio channel used to exchange management frames and/or WAVE messages. The WAVE message may be a WAVE short message (WSM). The control channel (CCH) may represent a radio channel mainly used for exchanging management messages or basic safety messages. The service channel (SCH) is a radio channel used to provide service and refers to any channel that is not the control channel. According to an embodiment, the control channel may be used to communicate system management messages, such as WAVE service advertisements (WSAs), or WAVE short message protocol (WSMP) messages. The control channel may also be used for communication of WAVE Service Advertisement (WSA) of Wave Short Message Protocol (WSMP) or Service Announcement Message (SAM) of Basic Transport Protocol (BTP)/Geo-networking. The SCH may be used for general-purpose application data communication, and such general-purpose application data communication may be coordinated by service-related information such as WSA.

WSA may also be referred to hereinafter as service advertisement information. WSA may provide information including an announcement of the availability of application-service. The WSA message may identify and describe the application service and the channel accessible by the service. According to an embodiment, WSA may include a header, service information, channel information, and WAVE routing advertisement information.

The service advertisement information for service access may be a periodic message. As an embodiment, Co-operative Awareness Messages (CAM) may be periodic messages.

The V2X communication device may broadcast a Cooperative Awareness Message (CAM), a Decentralized Environmental Notification Message (DENM), or a Basic Safety Message (BSM).

The CAM is distributed in the ITS network and provides information for at least one of presence, location, and communication status of the ITS station. DENM provides information for detected events. DENM may provide information for any driving situation or event detected by the ITS station. For example, DENM may provide information for situations, such as emergency electronic brakes, vehicle accidents, vehicle problems, traffic conditions, and the like. CAMs may be periodically broadcasted by the facility layer. As an embodiment, the WSA or SAM may be a periodic message. WSA or SAM may be periodically broadcasted by the facility layer.

Decentralized Environmental Notification Messages (DENM) may be event messages. Event messages may be triggered and transmitted by detection of an event. Service messages may be sent to manage the session. In the following embodiments, the event message may include a safety message/information. The service message may include a non-safety message/information.

As an embodiment, a Basic Safety Message (BSM) may be transmitted and received. The BSM message is the most basic message among the messages defined in the SAE J2735 standard and provides vehicle safety-related information. These BSM messages may be used in various applications for exchanging safety data regarding vehicle conditions. The BSM message may be referred to as a basic safety message or a vehicle safety message.

Hereinafter, a geo-networking communication method for hybrid communication is described.

The current V2X communication technology may perform geo-networking communication for long range data delivery based on a multi-hop relay concept. In the disclosure, the ad-hoc/direct/P2P communication technology may include DSRC/802.11 access technology and/or LTE-sidelink technology, and these communication technologies may be used in each hop. In the disclosure, an ad-hoc communication technology based on 802.11p or cellular technology may be referred to as direct communication. That is, direct communication may refer to communication between terminals without intervention of a base station.

Geo-networking communications have a room for enhancement in reliability, delay, and efficiency. Since geo-networking communication is based on a multi-hop relay, a communication failure of a single hop constituting a multi-hop may cause a total communication failure. Additionally, as the number of hops increases, the required channel usage and delay may increase.

The hybrid communication may refer to a communication method in which direct communication technology and cellular communication technology are used together. The direct communication technology may include a DSRC/802.11p access technology and/or an LTE-sidelink access communication technology. Cellular communication technology includes cellular-based access technology defined in 3GPP, such as 3G, 4G, LTE, and NR access technologies. When hybrid communication is used, the number of hops required for geo-networking communication may be reduced.

In order to utilize cellular communication technology for geo-networking protocols, additional technology may be required. For example, there may be proposed such technologies as a network structure for geo-networking using hybrid communication, a use scenario for geo-networking using hybrid communication, propagation of a forwarding algorithm type, a new packet structure and SAP composition for geo-networking using hybrid communication.

FIGS. 8(a) to 8(c) illustrate a geo-networking transmission method according to an embodiment of the disclosure.

FIGS. 8(a) to 8(c) illustrate a geo-networking transmission method that does not use hybrid communication. In the case of not using hybrid communication, each op constitutes an entire multi-hoe route by using ad-hoc/direct/P2P communication technologies including 802.11p and LTE side-links.

In the disclosure, destination may indicate a geographic area or a specific vehicle/V2X communication device/ITS station/router.

FIG. 8(a) illustrates a network architecture for geounicast, FIG. 8(b) illustrates a network architecture for geobroadcast, and FIG. 8(c) illustrates a network architecture for geoanicast.

FIGS. 9(a) to 9(c) illustrate a geo-networking transmission method using hybrid communication according to an embodiment of the disclosure.

FIGS. 9(a) to 9(c) illustrate a geo-networking transmission method that uses hybrid communication. In the case of using hybrid communication, each hop constitutes an entire multihop route by using a cellular technology including LTE uplink/downlink in addition to ad hoc/direct/P2P communication technologies including 802.11p and LTE sidelink.

FIG. 9(a) illustrates a network architecture for geounicast using hybrid communication, FIG. 9(b) illustrates a network architecture for geobroadcast using hybrid communication, and FIG. 9(c) illustrates a network architecture for geoanycast using hybrid communication.

In FIGS. 9(a) to 9(c), some of the multiple hops may be relayed by base stations of cellular communication.

FIG. 10 illustrates a use scenario for geo-networking using hybrid communication according to an embodiment of the disclosure.

FIG. 10 illustrates geo-networking using hybrid communication or geo-networking that does not use hybrid communication, and illustrates a case in which all vehicles are outside the coverage of a cellular base station. In the embodiment of FIG. 10, multi-hop communication consists of ad hoc communications.

FIGS. 11(a), and 11(b) illustrate a use scenario for geo-networking using hybrid communication according to an embodiment of the disclosure.

FIGS. 11(a), and 11(b) illustrate geo-networking using hybrid communication, and illustrates a case in which all vehicles are within the coverage of a cellular base station. In the embodiment of FIGS. 11(a), and 11(b), multi-hop communication may be performed by cellular communication or may be replaced by cellular communication.

FIG. 11(a) illustrates a case in which both a transmission vehicle and a target vehicle are included in the coverage of one cellular base station. Multi-hop communication is not performed by a plurality of vehicles, but may be relayed by a base station.

FIG. 11(b) illustrates a case where a transmission vehicle and a destination vehicle are each included in the coverage of a different cellular base station. Multi-hop communication is not performed by a plurality of vehicles, but may be relayed by a base station. That is, multi-hop communication may be relayed by a plurality of base stations.

FIG. 12 illustrates a usage scenario for geo-networking using hybrid communication according to an embodiment of the disclosure.

FIG. 12 illustrates a case in which some of the vehicles performing multi-hop communication are included in cellular base station coverage. Multihop communication may be relayed by a plurality of vehicles and a cellular base station.

For a geo-networking transmission method using hybrid communication, a plurality of forwarding algorithms may be used. A brief description of the forwarding algorithms is as follows.

(Non-area) Greedy Forwarding Algorithm (GF): The sender uses the location of the destination and the neighbor. The sender may select a receiver with the smallest distance to the destination among neighboring receivers stored in the location table as the forwarder. The sender unicasts GN (GeoNetwork) packets to the selected forwarder.

(Non-area) Contention based Forwarding Algorithm (CBF): The sender does not use the location of the destination. The sender broadcasts GN packets. Receivers set a timer. The time length of the timer is inversely proportional to the forward progress. Forward progress is defined as the difference between the sender's distance to the destination and the receiver's distance. A receiver whose timer has expired broadcasts reception GN packets, and other receivers that have received the broadcast stop the timer and delete the stored GN packet.

Simple GeoBroadcast Forwarding Algorithm: is used sed for geobroadcast. The sender broadcasts GN packets. The receivers located inside or at the boundary of the target area broadcast reception GN packets without duplicate detection. This algorithm may be considered as a rule for special cases.

Area Contention-based Forwarding Algorithm: is used for geobroadcast or geoanycast. This is the same as non-area contention-based forwarding except that forward progress is defined as the distance between the receiver and the sender, and receivers located inside or at the boundary of the target area broadcast reception GN packets without duplicate detection. This algorithm may be considered as a rule for special cases.

Area Advanced Forwarding Algorithm: An enhanced regional CBF in which greedy forwarding and regional CBF are used simultaneously. CBF applies only to receivers located outside the sectorial area. The receiver by greedy forwarding forwards the GN packet by greedy forwarding, and the receiver by the CBF algorithm forwards the GN packet by CBF algorithm.

Described below is a modified forwarding algorithm using hybrid communication.

FIG. 13 illustrates a basic forwarding algorithm using hybrid communication when a destination exists in the direct communication range of a sender.

When the destination is within the direct communication range of the sender, the sender may directly transmit the GN packet to the destination. In this case, even when both the sender vehicle and the destination vehicle are within the communication coverage of the cellular base station, inter-vehicle communication may be performed by direct ad-hoc communication.

FIG. 14 illustrates a basic forwarding algorithm using hybrid communication when a sender exists within the coverage of a cellular base station.

When the sender is within the communication range of the cellular base station, the sender may transmit a GN packet to the base station. In this case, cellular communication technology may be used. The GN packet may be forwarded directly or indirectly by the base station within the smallest distance to the destination of the GN packet.

FIG. 15 illustrates a basic forwarding algorithm using hybrid communication when a destination exists within the coverage of a cellular base station.

The destination may exist within the coverage of the cellular base station that receives the GN packet. The base station may send packets directly to the destination without additional relay. When the transport type of the GN packet is geounicast, the base station may unicast the GN packet to the target ITS station. When the transport type of the GN packet is geobroadcast, the base station may broadcast the GN packet to the target area. When the transport type of the GN packet is geoanycast, the base station may unicast the GN packet to any ITS station in the target area.

Described below is an enhanced greedy forwarding algorithm using hybrid communication.

FIG. 16 illustrates a use scenario of a first embodiment (EGF1) of an enhanced greedy forwarding algorithm according to an embodiment of the disclosure.

The sender may transmit a packet by using information for the location of the destination and neighbors and whether the neighbors are capable of hybrid communication. The capability of hybrid communication indicates whether a neighbor V2X communication device may not only perform direct communication but also communicate with the mobile cellular base station. For example, hybrid communication capability may mean the ability to utilize an LTE-Uu interface or any other cellular communication technology (3GPP defined cellular-based access technologies including 3G, 4G, LTE, and NR access technologies).

The sender may select, as a forwarder, a receiver having the smallest geographic distance to the destination among receivers capable of hybrid communication. If no receiver capable of hybrid communication exists in the vicinity, this algorithm may operate according to the original greedy forwarding algorithm.

The sender unicasts the GN packet to the selected forwarder. This algorithm may be implemented with minimal modifications to the original greedy algorithm.

The performance of hybrid communication may be collected by CAM or BSM. Required fields of the CAM and BSM for delivering hybrid communication capability information may be defined as follows.

Table 1 shows data elements of "hybridCapability", as an embodiment of hybrid performance information according to an embodiment of the disclosure. The hybrid performance information may identify the performance/availability of hybrid communication.

TABLE 1

| | |
|---|---|
| Descriptive Name | hybridCapability |
| Identifier | DataType_xxx |
| ASN.1 representation | HybridCapability ::= Boolean |
| Definition | This DE (Data Element) identifies the capability of hybrid communication. "1" means that the vehicle is capable of hybrid communication, and "0" means that the vehicle is not capable of hybrid communication. |
| Unit | N/A |

Table 2 shows data elements of "cellularCommunicationCapability", as an embodiment of hybrid performance information according to an embodiment of the disclosure. The cellular communication capability information may identify the capability/availability of cellular communication.

TABLE 2

| | |
|---|---|
| Descriptive Name | cellularCommunicationCapability |
| Identifier | DataType_xxx |
| ASN.1 representation | cellularCommunicationCapability ::= Boolean |
| Definition | This DE (Data Element) identifies the capability of cellular communication. "1" means that the vehicle is capable of cellular communication, and "0" means that the vehicle is not capable of cellular communication. |
| Unit | N/A |

Table 3 shows data elements of "equippedAccessTechnologies", as an embodiment of hybrid performance information according to an embodiment of the disclosure. The equipped access technology information may identify the access layer technology equipped in the vehicle/V2X communication device.

TABLE 3

| | |
|---|---|
| Descriptive Name | equippedAccessTechnologies |
| Identifier | DataType_xxx |
| ASN.1 representation | equippedAccessTechnologies ::= ENUMERATED { DSRC (0), LTE_PC5 (1), LTE_Uu (2), . . . } |
| Definition | This DE (Data Element) identifies the access layer technologies that the vehicle is equipped with. |
| Unit | N/A |

FIGS. 17(a), and 17(b) illustrate a configuration of a CAM according to an embodiment of the disclosure. FIG. 17(a) illustrates an embodiment in which a "hybridCapability" field corresponding to hybrid performance information is included in a basic container of a CAM. FIG. 17(b) illustrates an embodiment in which a "hybridCapability" field corresponding to hybrid performance information is included in an LF container of a CAM. FIGS. 17(a), and 17(b) illustrate an embodiment, in which a hybrid capability field may be included in a container/field different from that of FIGS. 17(a), and 17(b).

In FIGS. 17(a), and 17(b), a description of headers and containers included in the CAM is as follows.

ITS PDU header: This is a common message header for application layer messages and facility layer messages. This is included as a message header at the beginning of the ITS message. The DF (data frame) may include the following information.

protocolVersion (protocol version information): indicates the version of the ITS message and/or communication protocol.

messageID (message ID information): indicates the type of ITS message (e.g., CAM, DENM).

stationID (station ID information): The identifier of the ITS station generating the ITS message.

Basic Container: provides basic information for ITS-S. The basic container may exist for CAMs created by all ITS stations implementing CA basic services. The basic container may include the following information.

stationType (station type information): type of ITS-S referencePostion (reference position information): In CAM generation, the latest geographic position of ITS-S obtained by CA basic service. Or, this indicates the geographic position of the ITS-S at the time of generating the corresponding CAM.

HF container: The HF container may contain dynamic status information for the ITS station vehicle, such as heading or speed. The HF container may contain all fast-changing state information. Some items in the HF container may be optional for CAM and may be included as needed.

LF container: The LF container may contain static or slow-changing vehicle data, such as the state of an exterior light. The LF container items may be optional for CAM and may be included as needed.

Special vehicle container: may provide additional status information. In road traffic, a vehicle ITS-S that performs a special role, such as public transportation, may provide additional status information through the special vehicle container. Special vehicle container items may be optional for CAM and may be included as needed.

FIGS. 18(a), and 18(b) illustrate a configuration of a BSM according to an embodiment of the disclosure.

FIG. 18(a) illustrates an embodiment in which a "hybridCapability" field corresponding to hybrid performance information is included in a core data container of a BSM. FIG. 18(b) illustrates an embodiment in which a "hybridCapability" field corresponding to hybrid performance information is included in a part II container of a BSM. FIGS. 18(a), and 18(b) illustrate an embodiment, in which a hybrid capability field may be included in a container/field different from that of FIGS. 18(a), and 18(b).

In FIGS. 18(a), and 18(b), a description of containers included in the BSM is as follows.

CoreData container: This data frame may include a critical core data element that is required whenever a BSM is issued. For example, the core data container may include a message count, a message ID, basic information for a vehicle, position and kinetic information, and the like. Some items of the core data container may be optional for BSM and may be included as needed.

Part II container: Part 2 data items may be optional for BSM and may be included as needed. The Part 2 container may contain extension information for vehicle safety, special vehicles, and supplemental vehicles.

Regional container: The regional container may include region-specific extension information.

The hybrid communication capability information described above is regularly broadcast and may be shared with neighbors. When the sender starts transmitting GN packets by geo-networking, the vehicle may already be aware of the hybrid communication capabilities of its neighbors.

FIG. 19 illustrates a use scenario of a second embodiment (EGF2) of an enhanced greedy forwarding algorithm according to another embodiment of the disclosure.

The sender may transmit a packet by using information for the location of the destination and neighbors and the hybrid communication capability of the neighbors. Also, the sender may transmit a packet by using information for whether a neighboring vehicle capable of hybrid communication exists within the range of cellular communication.

The sender may select, as a forwarder, a receiver having the smallest geographic distance to the destination among receivers capable of hybrid communication. Further, the sender may select, as a forwarder, a receiver having the smallest geographic distance to the destination from among receivers capable of hybrid communication within the range of cellular communication. If no receiver capable of hybrid communication exists within the cellular communication range, this algorithm may operate according to the original greedy forwarding algorithm.

Whether a vehicle capable of hybrid communication is within cellular communication range may be collected by the CAM or BSM. The required fields of CAM and BSM for this may be defined as follows.

Table 4 shows data elements of "cellularInRange" as an embodiment of information indicating whether it is within the cellular communication range according to an embodiment of the disclosure. The cellular in range information indicates whether a vehicle capable of hydride communication is within the cellular communication range.

TABLE 4

| | |
|---|---|
| Descriptive Name | cellularInRange |
| Identifier | DataType_xxx |
| ASN.1 representation | CellularInRange ::= Boolean |
| Definition | This DE (Data Element) identifies whether the hybrid communication capable vehicle is in rage. "1" means that the vehicle is in range, and "0" means that the vehicle is not in rage. |
| Unit | N/A |

FIG. 20 illustrates a configuration of a CAM according to an embodiment of the disclosure. FIG. 20 illustrates an embodiment in which cellular range information is included in an HF container. FIG. 20 illustrates an embodiment, in which the cellular range field may be included in a container/field different from that of FIG. 20. FIG. 21 illustrates a configuration of a BSM according to an embodiment of the disclosure. FIG. 21 illustrates an embodiment in which cellular range information of a BSM is included in a Part 2 container. FIG. 21 illustrates an embodiment, in which the cellular range field may be included in a container/field different from that of FIG. 21.

The hybrid communication capability information described above is regularly broadcast and may be shared with neighbors. When the sender starts transmitting GN packets by geo-networking, the vehicle may already be aware of the hybrid communication capabilities of its neighbors.

FIG. 22 is a flowchart illustrating a forwarding algorithm of EGF1 and/or EFG2 according to an embodiment of the disclosure.

The sender 22010 may receive a CAM or BSM from neighboring vehicles 22020 and 22030. The CAM or BSM may include at least one of location information, hybrid capability information, and cellular range information, as in the embodiments of FIGS. 16 to 21.

The sender has at least one of current, location information, hybrid performance information, or cellular range information for neighboring vehicles. The sender transmits a packet based on at least one of location information, hybrid capability information, or cellular range information for neighboring vehicles. The sender transmits the GN packet based on the EFG1 or EGF2 algorithm.

Described below is a sender management/managed forwarding algorithm using hybrid communication.

FIG. 23 illustrates a use scenario of a first embodiment (SMF1) of a sender managed forwarding algorithm according to an embodiment of the disclosure.

The sender uses the location information for the destination and neighbors, and uses the information for whether the neighbors are capable of hybrid communication.

The sender selects a receiver having the most reliable communication link with the sender among receivers capable of hybrid communication as a forwarder. When it is difficult or impossible to determine the quality of the communication link with the receiver, the receiver closest to the sender may be selected as the forwarder. If there is no receiver capable of hybrid communication, this algorithm may be performed as an original greedy forwarding algorithm.

The sender may unicast the GN packet to the selected forwarder.

The SMF1 algorithm may enhance the reliability of greedy forwarding. When the receiver closest to the sender is selected, communication reliability may be enhanced as compared to a case where a receiver far from the sender is selected. Since a receiver at a close distance is selected, a larger number of hops are required at the same distance, thereby increasing latency. However, since a cellular network is used according to the disclosure, the increase in the number of hops and latency may be neglected.

FIG. 24 illustrates a use scenario of a second embodiment (SMF2) of a sender managed forwarding algorithm according to an embodiment of the disclosure.

The sender uses the location information for the destination and neighbors, and uses the information for whether the neighbors are capable of hybrid communication. Further, the sender may use information for whether neighbors capable of hybrid communication are within a cellular communication range.

The sender selects a receiver having the most reliable communication link with the sender from among receivers capable of hybrid communication within the cellular communication range as a forwarder. When it is difficult or impossible to determine the quality of the communication link with the receiver, the receiver closest to the sender may be selected as the forwarder. If there is no receiver capable of hybrid communication, this algorithm may be performed as an original greedy forwarding algorithm.

The sender may unicast the GN packet to the selected forwarder.

Before starting the algorithm of SMF1 and SMF2, the sender may gather required information of neighboring vehicles, as in the above-described embodiments of EGF1 and EFG2.

Hereinafter, an enhanced contention-based forwarding algorithm for hybrid communication is described.

FIG. 25 illustrates a use scenario of a first embodiment (EFBF1) of an enhanced contention-based forwarding algorithm for hybrid communication.

In this embodiment, the sender does not use the location information for the destination and neighbors, nor does it use information about whether the neighbors are capable of hybrid communication. The sender broadcasts GN packets. The receiver sets a timer.

The length of time of the timer may be a value based on the capability of hybrid communication. The time length of the timer is a value depending on the capability of hybrid communication plus another value inversely proportional to the forward progress. Forward progress is defined as the difference between the sender's distance to the destination and the receiver's distance. The GN packet received by the receiver whose timer has expired is broadcast. The other receivers that have received this GN packet may stop the timer and drop the GN packet.

The timer time at which the packet is buffered in the buffer may be determined as in Equation 1.

$$TO\_CBF = TO\_CBF\_MAX + \frac{TO\_CBF\_MIN - TO\_CBF\_MAX}{DIST\_MAX} \times PROG + WT\_HYB\_CAPA \qquad [\text{Equation 1}]$$

TO_CBF_MIN: Minimum duration during which the CBF packet buffer is buffered

TO_CBF_MAX: Maximum duration during which the CBF packet buffer is buffered

PROG: indicates forwarding progress. For example, it may be the difference between the distance of the sender to the destination and the distance of the receiver. The value of PROG may be 0 or more and may be not more than DIST_MAX.

DIST_MAX: theoretical maximum range of non-cellular V2V direct communication

WT_HYB_CAPA: the value for waiting time depending on the capability of hybrid communication. When the receiver is capable of hybrid communication, the hybrid communication availability time value may be set to 0. When the receiver is unable to perform hybrid communication, the hybrid communication availability time value may be set to TO_CBF_MAX.

In the embodiment of FIG. 25, the timer time length may be determined as follows. In the embodiment of FIG. 25, it is assumed that TO_CBF_MIN=500 ms, TO_CBF_MAX=3 s, and DIST_MAX=100 m. The distance to the destination is assumed to be sender=200 m, vehicle (1)=180 m, vehicle (2)=150 m, vehicle (3)=120 m, vehicle (4)=160 m, and vehicle (5)=190 m. In this case, the length of the timer time for each vehicle may be determined as in Table 5.

TABLE 5

| vehicle | PROG | WT_HYB_CAPA | Time length of timer (TO_CBF) |
|---|---|---|---|
| (1) | 20 | 3 | 3 + (−2.5/100) × 20 + 3 = 5.5 s |
| (2) | 50 | 3 | 3 + (−2.5/100) × 50 + 3 = 4.75 s |
| (3) | 80 | 0 | 3 + (−2.5/100) × 80 + 0 = 1 s |
| (4) | 40 | 0 | 3 + (−2.5/100) × 40 + 0 = 2 s |
| (5) | 10 | 0 | 3 + (−2.5/100) × 10 + 0 = 2.75 s |

Vehicle 3 is the closest to the destination among receivers capable of cellular communication. Thus, vehicle 3 has a minimum waiting time for GN packet forwarding.

FIG. 26 is a view illustrating an execution operation of an ECVF1 algorithm according to the embodiment of FIG. 25. In FIG. 26, the sender vehicle 26010 broadcasts the GN packet and deletes the transmitted GN packet. Each of the neighboring vehicles 26020 to 26060 sets a timer. The timer waiting time is as shown in Table 5. Neighboring vehicle 3 26040 broadcasts a GN packet after a timer waiting time of 1 s. Other neighboring vehicles that have set a timer as neighboring vehicle 3 delete the same packet and stop the timer when receiving the packet transmitted by neighboring vehicle 3. The vehicle 26070 to perform the next hop may set a timer and perform forwarding.

FIG. 27 illustrates a use scenario of a second embodiment (EFBF2) of an enhanced contention-based forwarding algorithm for hybrid communication.

In this embodiment, the sender does not use the location information for the destination and neighbors, nor does it use information about whether the neighbors are capable of hybrid communication. The sender broadcasts GN packets. The receiver sets a timer.

The time length of the timer may be a value based on the capability of the hybrid communication and the current availability of the hybrid communication. The time length of the timer is a value depending on the capability and current availability of hybrid communication plus another value inversely proportional to the forward progress. Forward progress is defined as the difference between the sender's distance to the destination and the receiver's distance. The GN packet received by the receiver whose timer has expired is broadcast. The other receivers that have received this GN packet may stop the timer and drop the GN packet.

The timer time at which the packet is buffered in the buffer may be determined as in Equation 2.

$$TO\_CBF = TO\_CBF\_MAX + \frac{TO\_CBF\_MIN - TO\_CBF\_MAX}{DIST\_MAX} \times PROG + WT\_HYB\_CAPA + WT\_HYB\_Coverage \qquad [\text{Equation 2}]$$

TO_CBF_MIN: Minimum duration during which the CBF packet buffer is buffered

TO_CBF_MAX: Maximum duration during which the CBF packet buffer is buffered

PROG: indicates forwarding progress. For example, it may be the difference between the distance of the sender to the destination and the distance of the receiver. The value of PROG may be 0 or more and may be not more than DIST_MAX.

DIST_MAX: theoretical maximum range of non-cellular V2V direct communication

WT_HYB_CAPA: the value for waiting time depending on the capability of hybrid communication. When the receiver is capable of hybrid communication, the hybrid communication availability time value may be set to 0. When the receiver is unable to perform hybrid communication, the hybrid communication availability time value may be set to TO_CBF_MAX.

WT_HYB_Coverage: the value for waiting time based on the current availability of hybrid communication. When the receiver is within the coverage of the cellular base station, the hybrid coverage waiting time value may be set to 0. When the receiver is not within the coverage of the cellular base station, the hybrid coverage waiting time value may be set to TO_CBF_MAX.

In the embodiment of FIG. 27, the timer time length may be determined as follows. In the embodiment of FIG. 25, it is assumed that TO_CBF_MIN=500 ms, TO_CBF_MAX=3 s, and DIST_MAX=100 m. The distance to the destination is assumed to be sender=200 m, vehicle (1)=180 m, vehicle (2)=150 m, vehicle (3)=120 m, vehicle (4)=160 m, and vehicle (5)=190 m. In this case, the length of the timer time for each vehicle may be determined as in Table 6.

TABLE 6

| vehicle | PROG | WT_HYB_CAPA | WT_HYB_Coverage | Time length of timer (TO_CBF) |
| --- | --- | --- | --- | --- |
| (1) | 20 | 3 | 3 | 3 + (−2.5/100) × 20 + 3 + 3 = 8.5 s |
| (2) | 50 | 3 | 3 | 3 + (−2.5/100) × 50 + 3 + 3 = 7.75 s |
| (3) | 80 | 0 | 3 | 3 + (−2.5/100) × 80 + 0 + 3 = 4 s |
| (4) | 40 | 0 | 0 | 3 + (−2.5/100) × 40 + 0 + 0 = 2 s |
| (5) | 10 | 0 | 0 | 3 + (−2.5/100) × 10 + 0 + 0 = 2.75 s |

Vehicle 4 is the closest to the destination among receivers capable of cellular communication within cellular communication coverage. Thus, vehicle 4 has a minimum waiting time for GN packet forwarding. FIG. 28 is a view illustrating an execution operation of an ECVF2 algorithm according to the embodiment of FIG. 26.

In FIG. 28, the sender vehicle 28010 broadcasts the GN packet and deletes the transmitted GN packet. Each of the neighboring vehicles 28020 to 28060 sets a timer. The timer waiting time is as shown in Table 6. Neighboring vehicle 4 22050 broadcasts a GN packet after a timer waiting time of 2 s. Other neighboring vehicles that have set a timer as neighboring vehicle 4 delete the same packet and stop the timer when receiving the packet transmitted by neighboring vehicle 4. The vehicle 22070 to perform the next hop may set a timer and perform forwarding.

FIG. 29 illustrates a use scenario of a Combined Sender-based and Contention-based Forwarding (CSCF) algorithm according to an embodiment of the disclosure.

The sender uses the destination and the location of their neighbors. The sender may select at least one receiver having the smallest distance to the destination as a forwarder. The sender may unicast or multicast the GN packet with at least one selected forwarder.

The receiver sets a timer. The length of the timer may be inversely proportional to a forwarding progress corresponding to a difference between the distance of the sender to the destination and the distance of the receiver. When the timer expires, the receiver broadcasts the received GN packet, and other receivers stop the timer and delete the GN packet.

In the embodiment of FIG. 29, the timer time length may be determined as follows. In the embodiment of FIG. 25, it is assumed that TO_CBF_MIN=500 ms, TO_CBF_MAX=3 s, and DIST_MAX=100 m. The distance to the destination is assumed to be sender=200 m, vehicle (1)=180 m, vehicle (2)=150 m, vehicle (3)=120 m, vehicle (4)=160 m, and vehicle (5)=190 m. In this case, the length of the timer time for each vehicle may be determined as in Table 7.

TABLE 7

| vehicle | PROG | Time length of timer (TO_CBF) |
| --- | --- | --- |
| (2) | 50 | 3 + (−2.5/100) × 50 = 1.75 s |
| (3) | 80 | 3 + (−2.5/100) × 80 = 1 s |
| (4) | 40 | 3 + (−2.5/100) × 40 = 2 s |

Vehicle 3 is the closest to the destination among receivers within direct ad-hoc communication coverage. Thus, vehicle 3 has a minimum waiting time for GN packet forwarding. FIG. 30 is a view illustrating an execution operation of a CSCF algorithm according to the embodiment of FIG. 29.

In FIG. 30, the sender vehicle 30010 broadcasts the GN packet and deletes the transmitted GN packet. Each of the neighboring vehicles 30020 to 30060 sets a timer. The timer waiting time is as shown in Table 7. Neighboring vehicle 3 22040 broadcasts a GN packet after a timer waiting time of 1 s. The other neighboring vehicles that have set a timer as neighboring vehicle 3 delete the same packet and stop the timer when receiving the packet transmitted by neighboring vehicle 3. The vehicle 30070 to perform the next hop may set a timer and perform forwarding.

FIG. 31 illustrates a first embodiment of an Enhance Combined Sender-based and Contention-based Forwarding (ECSCF) algorithm using hybrid communication according to an embodiment of the disclosure.

The sender uses the destination and the location of their neighbors. The sender may select at least one receiver having the smallest distance to the destination as a forwarder. The sender may unicast or multicast the GN packet with at least one selected forwarder.

The receiver sets a timer. The length of the timer may be inversely proportional to a forwarding progress corresponding to a difference between the distance of the sender to the destination and the distance of the receiver. Further, as in the above-described embodiment, the length of the timer may be based on the capability of hybrid communication. When the timer expires, the receiver broadcasts the received GN packet, and other receivers stop the timer and delete the GN packet.

In the embodiment of FIG. 31, the timer time length may be determined as follows. In the embodiment of FIG. 31, it is assumed that TO_CBF_MIN=500 ms, TO_CBF_MAX=3 s, and DIST_MAX=100 m. The distance to the destination is assumed to be sender=200 m, vehicle (1)=180 m, vehicle (2)=150 m, vehicle (3)=120 m, vehicle (4)=160 m, and vehicle (5)=190 m. In this case, the length of the timer time for each vehicle may be determined as in Table 8.

TABLE 8

| vehicle | PROG | WT_HYB_CAPA | Time length of timer (TO_CBF) |
| --- | --- | --- | --- |
| (2) | 50 | 0 | 3 + (−2.5/100) × 50 + 0 = 1.75 s |
| (3) | 80 | 3 | 3 + (−2.5/100) × 80 + 3 = 4 s |
| (4) | 40 | 0 | 3 + (−2.5/100) × 40 + 0 = 2 s |

Vehicle 2 is the closest to the destination among receivers capable of cellular communication. Thus, vehicle 2 has a minimum waiting time for GN packet forwarding. The flowchart for the embodiment of FIG. 31 is similar to ECBF1 and/or CSCF described above.

FIG. 32 illustrates a second embodiment of an Enhance Combined Sender-based and Contention-based Forwarding (ECSCF) algorithm using hybrid communication according to an embodiment of the disclosure.

The sender uses the destination and the location of their neighbors. The sender may select at least one receiver having the smallest distance to the destination as a forwarder. The sender may unicast or multicast the GN packet with at least one selected forwarder.

The receiver sets a timer. The length of the timer may be inversely proportional to a forwarding progress corresponding to a difference between the distance of the sender to the destination and the distance of the receiver. Further, as in the above-described embodiment, the length of the timer may be based on the hybrid communication capability and the current communication availability. When the timer expires, the receiver broadcasts the received GN packet, and other receivers stop the timer and delete the GN packet.

In the embodiment of FIG. 32, the timer time length may be determined as follows. In the embodiment of FIG. 32, it is assumed that TO_CBF_MIN=500 ms, TO_CBF_MAX=3 s, and DIST_MAX=100 m. The distance to the destination is assumed to be sender=200 m, vehicle (1)=180 m, vehicle (2)=150 m, vehicle (3)=120 m, vehicle (4)=160 m, and vehicle (5)=190 m. In this case, the length of the timer time for each vehicle may be determined as in Table 9.

TABLE 9

| vehicle | PROG | WT_HYB_CAPA | WT_HYB_Coverage | Time length of timer (TO_CBF) |
|---|---|---|---|---|
| (2) | 50 | 0 | 3 | 3 + (−2.5/100) × 50 + 0 + 3 = 4.75 s |
| (3) | 80 | 3 | 3 | 3 + (−2.5/100) × 80 + 3 + 3 = 7 s |
| (4) | 40 | 0 | 0 | 3 + (−2.5/100) × 40 + 0 + 0 = 2 s |

Vehicle 4 is capable of cellular communication and is the closest to the destination among receivers within the range of cellular communication. Thus, vehicle 4 has a minimum waiting time for GN packet forwarding. The flowchart for the embodiment of FIG. 32 is similar to ECBF1 and/or CSCF described above.

Hereinafter, propagation of the forwarding algorithm type is described.

In the above-described embodiments, receivers may only know whether the received GN packet has been delivered by unicast or broadcast. Based on this knowledge, the forwarder forwards (e.g., greedy forwarding) the GN packet by unicast (e.g., greedy forwarding) when the received packet is received by unicast, and forwards (e.g., contention-based forwarding) the GN packet by broadcast when the received packet is received by broadcast.

In contrast, when the forwarding algorithm as in the above-described embodiment is used, there may be needed a method for maintaining the originally intended algorithm for entire multi-hop routing. This is because the first sender selects the optimal forwarding algorithm considering, e.g., network traffic and priority of GN packets.

Table 10 shows the forwarding algorithm proposed in the disclosure.

TABLE 10

| Unicast | Multicast | Broadcast |
|---|---|---|
| EGF1 | CSCF | ECBF1 |
| EGF2 | ECSCF1 | ECBF2 |
| SMF1 | ECSCF2 | |
| SMF2 | | |

As shown in Table 10, simply recognizing the transmission method of unicast, multicast, or broadcast may be insufficient to maintain the intended forwarding algorithm. However, if the forwarder is able to find an optimal forwarding algorithm, the forwarder may change the forwarding algorithm. The type of forwarding algorithm intended by the original sender may need to be conveyed through the GN packet. The packet structure and SAP for delivering forwarding algorithm type information is described below.

FIG. 33 illustrates a configuration of a common header of a geo-networking packet according to an embodiment of the disclosure.

A description of each field included in the common header of FIG. 33 is as follows.

NH: The network header field identifies the type of the geo-networking header immediately following the geo-networking header.

HT: The header type field identifies the type of the geo-networking header. The geo-networking header type may include at least one of ANY, BEOCON, GEOUNICAST, GEOANYCAST, GEOBROADCAST, TSB, or LS.

HST: The header subtype field identifies the subtype of the geo-networking header. The subtype of the geo-networking header may include at least one of GEOANYCAST_CIRCLE, GEOANYCAST_RECT, GEOANYCAST_ELIP, GEOBROADCAST_CIRCLE, GEOBROADCAST_RECT, GEOBROADCAST_ELIP, SINGLE_HOP, MULTI_HOP, LS_REQUEST, LS_REPLY, or UNSPECIFIED.

TC: The traffic class field represents a traffic class indicating a facility-layer request for a packet transport.

Flags: Bit 0 may indicate whether the ITS-S is mobile or stationary (GN protocol constant itsGnIsMobile). Bits 1 to 7 are reserved.

PL: The payload length field indicates the length of the geo-networking payload.

MHL: The maximum hop limit field indicates the maximum hop limit.

FIG. 34 illustrates a configuration of a common header of a geo-networking packet according to an embodiment of the disclosure.

FIG. 34 includes a forwarding algorithm type field and a sub-forwarding type field. No duplicate description of the fields described in FIG. 33 is given.

FT: The forwarding algorithm type field identifies the type of forwarding algorithm. The forwarding algorithm type may include at least one of EGF1, EGF2, SMF1, SMF2, ECBF1, ECBF2, CSCF, ECSCF1, or ECSCF2.

SFT: The sub-forwarding type field identifies the sub-type of the forwarding algorithm. The sub-penetration may include at least one of UNSPECIFIED for EGF1, EGF2, SMF1, SMF2, ECBF1, and ECBF2, an integer (2 . . . 255) for CSCF, ECSCF1, or ECSCF2 indicating the number of receivers per sender.

At least one of FT information or SFT information may be included in an arbitrary position of the packet. For example, at least one of FT information or SFT information may be included in a reserved field of the geo-networking common header.

FIG. 35 illustrates propagation of forwarding type information according to an embodiment of the disclosure.

The sender 35010 forwards the GN packet with forwarding algorithm A. The type of forwarding algorithm may be included in the packet as described above.

Forwarder 1 35020 has difficulty in finding the optimal forwarding algorithm or does not try to find another forwarding algorithm. Forwarder 1 305020 forwards the GN packet using the forwarding algorithm A applied to the received packet. The type of forwarding algorithm may be included in the packet as described above.

Forwarder 2 35030 may find an optimal forwarding algorithm and may find other forwarding algorithms. Forwarder 2 35030 may forward the GN packet with a new forwarding algorithm B. The type of forwarding algorithm may be included in the packet as described above.

Hereinafter, a geo-networking-related SAP (Service Access Point) is described.

When the forwarding algorithm is determined by the geo-networking protocol layer, the packet structure of FIG. 35 may be configured by the geo-networking protocol layer.

When the forwarding algorithm is determined by the BTP layer, the forwarding algorithm need be informed via GN-SAP by the BTP layer. GN-DATA.request for obtaining the forwarding algorithm type and the forwarding algorithm subtype may be configured as follows.

GN-DATA.request {(primitive requesting to deliver data from BTP to Geo-networking protocol layer)
Upper protocol entity, (identifies upper protocol, BTP or GN6ASL)
Packet transport type, (identifies packet transport type: GeoUnicast, SHB, TSB, etc.)
Forwarding algorithm type (Identifies the type of forwarding algorithm. The allowed values are: EGF1, EGF2, SMF1, SMF2, ECBF1, ECBF2, CSCF, ECSCF1, ECSCF2)→devised
Forwarding algorithm subtype (Identifies the sub-type of forwarding algorithm. The allowed values are: UNSPECIFIED for EGF1, EGF2, SMF1, SMF2, ECBF1, and ECBF2, INTEGER (2 . . . 255) for CSCF, ECSCF1, and ECSCF2)→devised

---

Destination address (Destination's Geo-networking address)
Communication profile (identifies whether or not ITS-G5)
Security profile (security service profile/level to be applied)
ITS-AID length (length of ITS-AID field's value)
ITS-AID (ID of application which is the destination of data to be delivered)
Security permissions length (length of Security permissions field's value)
Security permissions (Service Specific Permissions associated with ITS-AID)
Security context information (information for selecting Security protocol's property)
Security target ID list length (length of Security target ID list field's value)
Security target ID list (list of target ID used by security entity)
Maximum packet lifetime (maximum time for packet preservation until reaching destination)
Repetition interval (repetition interval for packet transmission)
Maximum repetition time (total time allowed for packet transmission with repetitions)
Maximum hop limit (maximum allowed hops for packet transmission)
Traffic class (packet's traffic class)
Length (size of "Data" field)
Data, (data requested to send by BTP to Geo-networking layer)
. . .
}

---

If the forwarding algorithm is determined by the facilities layer, the forwarding algorithm type is needed to be informed by the facilities layer via the NF-SAP to BTP layer before informed to Geo-networking protocol layer via GN-SAP. BTP-DATA.request for obtaining the forwarding algorithm type and the forwarding algorithm subtype may be configured as follows.

---

BTP-DATA.request {(primitive requesting to deliver data from facilities to BTP layer)
BTP type, (identifies interactive (BTP-A) or non-interactive (BTP-B))
Source port, (BTP port sending data)
Destination port (BTP port to receive data)
Destination port info (additional information for well-known Destination port)
GN Packet transport type (identifies packet transport type: GeoUnicast, SHB, TSB, etc.)

---

GN Forwarding algorithm type (Identifies the type of forwarding algorithm. The allowed values are: EGF1, EGF2, SMF1, SMF2, ECBF1, ECBF2, CSCF, ECSCF1, ECSCF2)→devised
GN Forwarding algorithm subtype (Identifies the sub-type of forwarding algorithm. The allowed values are: UNSPECIFIED for EGF1, EGF2, SMF1, SMF2, ECBF1, and ECBF2, INTEGER (2 . . . 255) for CSCF, ECSCF1, and ECSCF2)→devised

---

GN Destination address (Geo-networking address of destination)
GN Communication profile (identifies whether or not ITS-G5)
GN Security profile (security service profile/level to be applied)
GN Maximum packet lifetime (maximum time for packet preservation until reaching destination)

```
GN Repetition interval (repetition interval for packet transmission)
GN Maximum repetition time (total time allowed for packet transmission with repetitions)
GN Maximum hop limit (maximum allowed hops for packet transmission)
GN Traffic class (packet's traffic class)
Length, (size of "Data" field)
Data, (data requested to send by facilities to BTP layer)
...
}
```

FIG. 36 illustrates an information flow when a cellular network is not available according to an embodiment of the disclosure.

Figure 37:
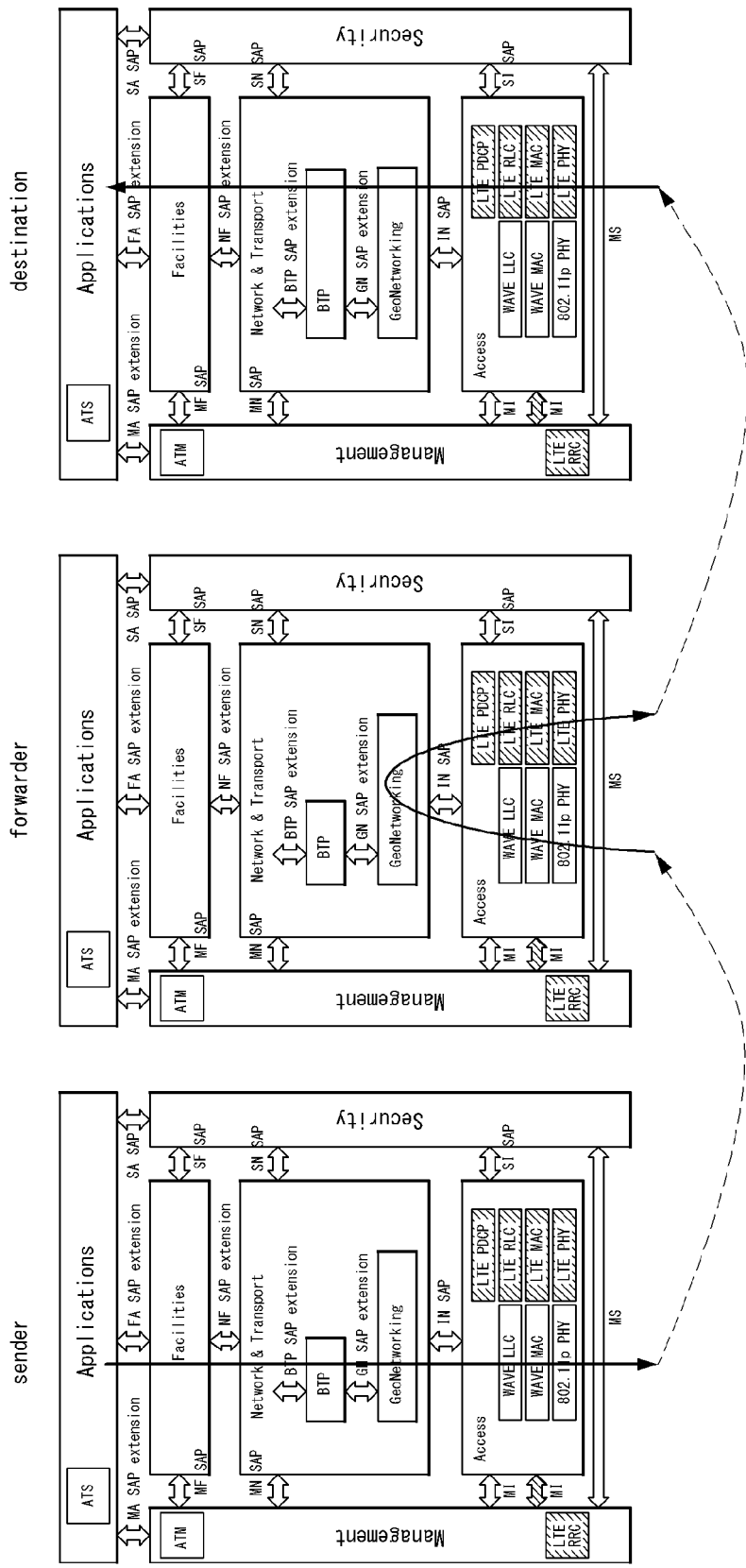
FIG. 37 illustrates an information flow when a cellular network is available according to an embodiment of the disclosure.

FIG. 37 illustrates an information flow when a cellular network is available according to an embodiment of the disclosure.

The disclosure may reduce the number of hops required and solve the problems with geo-networking by using cellular technology. Since the number of hops required is reduced, the transmission reliability, the overall delivery delay and network traffic are enhanced. Reducing the number of hops may alleviate the problems with geo-networking protocols.

FIG. 38 illustrates a V2X communication device according to an embodiment of the disclosure.

FIG. 38 is a block diagram of a hybrid V2X communication device according to an embodiment of the disclosure, and in the disclosure, the hybrid V2X communication device may be referred to as a V2X communication device.

Referring to FIG. 38, a V2X communication device 38000 may include a communication unit 38010, a processor 38020, and a memory 38030. As described above, the V2X communication device may correspond to an on board unit (OBU) or roadside unit (RSU) or may be included in an OBU or RSU. Or, the V2X communication device may correspond to an ITS station or may be included in an ITS station.

The communication unit 3810 may be connected to the processor 38020 to transmit/receive a wireless signal or a wired signal. The communication unit 38010 may up-convert data received from the processor 38020 into a transmission/reception band and transmit the signal. The communication unit may implement the operation of the access layer. According to an embodiment, the communication unit may implement the operation of the physical layer included in the access layer or may additionally implement the operation of the MAC layer. The communication unit may also include a plurality of sub communication units to perform communication according to a plurality of communication protocols.

The processor 38020 may be connected with the communication unit 38010 to implement the operation of the layers according to the ITS system or WAVE system. The processor 38020 may be configured to perform operations according to various embodiments of the disclosure as described with reference to the drawings. Further, according to various embodiments of the disclosure, at least one of a module, data, program, or software for implementing the operation of the V2X communication device 38000 may be stored in the memory 38030 and be executed by the processor 38020.

The memory 38030 is connected with the processor 38020 to store various pieces of data/information for driving the processor 38020. The memory 38030 may be included in the processor 38020 or be installed outside the processor 38020 and connected with the processor 38020 via a known means. The memory may include a secure/non-secure storage device or be included in a secure/non-secure storage device. According to an embodiment, the memory may be denoted a secure/non-secure storage device.

The specific configuration of the V2X communication device 38000 of FIG. 38 may be implemented so that the above-described various embodiments of the disclosure are applied independently from each other or two or more thereof are applied together.

In an embodiment of the disclosure, the communication unit may include at least two transceivers. The communication unit may include a transceiver performing communication according to the WLAN V2X communication protocol based on IEEE (Institute of Electrical and Electronics Engineers) 802.11, and a transceiver performing communication according to the cellular V2X communication protocol based on LTE/E-UTRA (Evolved Universal Terrestrial Access) or 5G NR (New Radio) of 3GPP (3rd Generation Partnership Project). The transceiver that performs communication according to the WLAN V2X communication protocol, such as ITS-G5, may be referred to as a WLAN transceiver. The transceiver that performs communication according to the cellular communication protocol, such as NR, may be referred to as a cellular transceiver.

FIG. 39 illustrates a geo-networking transmission method using hybrid communication including direct communication and cellular communication according to an embodiment of the disclosure.

The V2X communication device may receive a message from at least one neighboring vehicle (S39010). The message may correspond to CAM, DANM, or BSM. Alternatively, the message may include a geo-networking packet.

The V2X communication device may transmit a geo-networking packet to at least one neighboring vehicle (S39020). Geo-networking packet transmission may be performed based on at least one of a greedy-based forwarding algorithm, a sender-managed forwarding algorithm, and a contention-based forwarding algorithm.

As illustrated in FIGS. 17 and 18, the received message may include hybrid performance information for a neighboring vehicle. The hybrid performance information may indicate whether the neighboring vehicle is capable of hybrid communication.

As in the embodiments of FIGS. 20 and 21, the received message may include cellular in range information. The cellular in range information may indicate whether the neighboring vehicle is within the coverage of a cellular base station.

As in the embodiment of FIG. 34, the transmitted geo-networking packet may include forwarding algorithm type information. The forwarding algorithm type information may indicate the type of forwarding algorithm through which a geo-networking packet is transmitted. Further, the geo-networking packet may further include forwarding algorithm subtype information.

The greedy-based forwarding algorithm may include at least one type of an Enhanced Greedy Forwarding 1 (EFG1)

algorithm or an Enhanced Greedy Forwarding 2 (EFG2) algorithm. The sender managed forwarding algorithm may include at least one type of a Sender Managed Forwarding 1 (SMF1) algorithm or a Sender Managed Forwarding 1 (SMF2) algorithm. The contention-based forwarding algorithm may include at least one type of an ECBF1 (Enhanced Contention-Based Forward 1) algorithm, an ECBF2 (Enhanced Contention-Based Forward 1) algorithm, a CSCF (Combined Sender-based and Contention-based Forwarding) algorithm, an ECSCF1 (Enhance Combined Sender-based) and Contention-based Forwarding 1) algorithm, or an Enhance Combined Sender-based and Contention-based Forwarding 2 (ECSCF2) algorithm. The above-described forwarding algorithm type information may indicate at least one of the above-described forwarding algorithms described in the disclosure.

Geo-networking packet transmission may be performed by a contention-based forwarding algorithm. As in the embodiment of Equation 1, the buffering time of the timer for packet forwarding may be determined based on the hybrid communication capability of the receiver. As in the embodiment of Equation 2, the buffering time of the timer for packet forwarding may be determined based on the hybrid communication capability of the receiver and whether the receiver is within cellular coverage. As an embodiment, the buffering time of the timer for packet forwarding may be determined based on at least one of the hybrid communication capability of the receiver receiving a geo-networking packet or whether the receiver is within the cellular coverage. A receiver capable of hybrid communication may set a shorter buffering time than a receiver capable of hybrid communication. Further, a receiver within cellular coverage may set a shorter buffering time than a receiver out of cellular coverage.

The above-described embodiments regard predetermined combinations of the components and features of the disclosure. Each component or feature should be considered as optional unless explicitly mentioned otherwise. Each component or feature may be practiced in such a manner as not to be combined with other components or features. Further, some components and/or features may be combined together to configure an embodiment of the disclosure. The order of the operations described in connection with the embodiments of the disclosure may be varied. Some components or features in an embodiment may be included in another embodiment or may be replaced with corresponding components or features of the other embodiment. It is obvious that the claims may be combined to constitute an embodiment unless explicitly stated otherwise or such combinations may be added in new claims by an amendment after filing.

The embodiments of the disclosure may be implemented by various means, e.g., hardware, firmware, software, or a combination thereof. When implemented in hardware, an embodiment of the disclosure may be implemented with, e.g., one or more application specific integrated circuits (ASICs), digital signal processors (DSPs), digital signal processing devices (DSPDs), programmable logic devices (PLDs), field programmable gate arrays (FPGAs), processors, controllers, micro-controllers, or micro-processors.

When implemented in firmware or hardware, an embodiment of the disclosure may be implemented as a module, procedure, or function performing the above-described functions or operations. The software code may be stored in a memory and driven by a processor. The memory may be positioned inside or outside the processor to exchange data with the processor by various known means.

It is apparent to one of ordinary skill in the art that the disclosure may be embodied in other specific forms without departing from the essential features of the disclosure. Thus, the above description should be interpreted not as limiting in all aspects but as exemplary. The scope of the disclosure should be determined by reasonable interpretations of the appended claims and all equivalents of the disclosure belong to the scope of the disclosure.

Detailed Description of Exemplary Embodiments

It is appreciated by one of ordinary skill in the art that various changes and modifications may be made to the embodiments of the disclosure without departing from the scope or spirit of the disclosure. Thus, all such changes or modifications are intended to belong to the scope of the disclosure as defined by the appended claims or equivalents thereof.

The disclosure sets forth both devices and methods, and descriptions thereof may be complementarily applicable to each other.

Various embodiments have been described in the best mode for practicing the disclosure.

INDUSTRIAL AVAILABILITY

The disclosure is used in a series of vehicle communication fields.

It is appreciated by one of ordinary skill in the art that various changes and modifications may be made to the embodiments of the disclosure without departing from the scope or spirit of the disclosure. Thus, all such changes or modifications are intended to belong to the scope of the disclosure as defined by the appended claims or equivalents thereof

The invention claimed is:
1. A method of geo-networking transmission based on hybrid communication including direct communication and cellular communication, the method comprising:
receiving a message from at least one neighboring vehicle; and
transmitting a geo-networking packet to the at least one neighboring vehicle, wherein
the transmission of the geo-networking packet is performed based on at least one forwarding algorithm of a greedy-based forwarding algorithm, a sender-managed forwarding algorithm, or a contention-based forwarding algorithm,
wherein the received message is related to a Cooperative Awareness Message (CAM), a Decentralized Environmental Notification Message (DENM), or a Basic Safety Message (BSM),
wherein the greedy-based forwarding algorithm includes at least one type of an enhanced greedy forwarding 1 (EFG1) algorithm or an enhanced greedy forwarding 2 (EFG2) algorithm,
wherein the sender managed forwarding algorithm includes at least one type of a sender managed forwarding 1 (SMF1) algorithm or a sender managed forwarding 1 (SMF2) algorithm, and
wherein the contention-based forwarding algorithm includes an enhanced contention-based Forward 1 (ECBF1) algorithm, an enhanced contention-based forward 2 (ECBF2) algorithm, a combined sender-based and contention-based forwarding (CSCF) algorithm, an enhance combined sender-based and contention-based forwarding 1 (ECSCF1) algorithm, or an enhance combined sender-based and contention-based forwarding 2 (ECSCF2) algorithm.

2. The method of claim 1, wherein the received message includes hybrid capability information for the neighboring vehicle, and wherein the hybrid capability information is related to the neighboring vehicle being capable of the hybrid communication.

3. The method of claim 2, wherein the received message includes cellular in range information, and wherein the cellular in range information is related to the neighboring vehicle being within coverage of a cellular base station.

4. The method of claim 1, wherein the geo-networking packet includes forwarding algorithm type information, and wherein the forwarding algorithm type information identifies a type of forwarding algorithm through which the geo-networking packet is transmitted.

5. The method of claim 3, wherein based on the transmission of the geo-networking packet being performed based on the contention-based forwarding algorithm, a buffering time of a timer for packet forwarding is determined based on at least one of a hybrid communication capability of a receiver receiving the geo-networking packet or the receiver being within the cellular coverage.

6. A communication device performing hybrid communication including direct communication and cellular communication, the communication device comprising:
  a memory storing data;
  a transceiver transmitting and receiving a wireless signal including a geo-networking packet; and
  a processor controlling the memory and the transceiver, wherein the processor:
  receives a message from at least one neighboring vehicle; and
  transmits a geo-networking packet to the at least one neighboring vehicle, wherein the received message is related to a Cooperative Awareness Message (CAM), a Decentralized Environmental Notification Message (DENM), or a Basic Safety Message (BSM),
  wherein the transmission of the geo-networking packet is performed based on at least one forwarding algorithm of a greedy-based forwarding algorithm, a sender-managed forwarding algorithm, or a contention-based forwarding algorithm,
  wherein the greedy-based forwarding algorithm includes at least one type of an enhanced greedy forwarding 1 (EFG1) algorithm or an enhanced greedy forwarding 2 (EFG2) algorithm,
  wherein the sender managed forwarding algorithm includes at least one type of a sender managed forwarding 1 (SMF1) algorithm or a sender managed forwarding 1 (SMF2) algorithm, and
  wherein the contention-based forwarding algorithm includes an enhanced contention-based Forward 1 (ECBF1) algorithm, an enhanced contention-based forward 2 (ECBF2) algorithm, a combined sender-based and contention-based forwarding (CSCF) algorithm, an enhance combined sender-based and contention-based forwarding 1 (ECSCF1) algorithm, or an enhance combined sender-based and contention-based forwarding 2 (ECSCF2) algorithm.

7. The communication device of claim 6, wherein the received message includes hybrid capability information for the neighboring vehicle, and wherein the hybrid capability information is related to the neighboring vehicle being capable of the hybrid communication.

8. The communication device of claim 7, wherein the received message includes cellular in range information, and wherein the cellular in range information is related to the neighboring vehicle being within coverage of a cellular base station.

9. The communication device of claim 6, wherein the geo-networking packet includes forwarding algorithm type information, and wherein the forwarding algorithm type information identifies a type of forwarding algorithm through which the geo-networking packet is transmitted.

10. The communication device of claim 8, wherein based on the transmission of the geo-networking packet being performed based on the contention-based forwarding algorithm, a buffering time of a timer for packet forwarding is determined based on at least one of a hybrid communication capability of a receiver receiving the geo-networking packet or the receiver being within the cellular coverage.

* * * * *